US011089154B2

(12) United States Patent
Kim

(10) Patent No.: US 11,089,154 B2
(45) Date of Patent: Aug. 10, 2021

(54) ELECTRONIC APPARATUS, CONTROLLING METHOD OF ELECTRONIC APPARATUS AND COMPUTER READABLE MEDIUM

(71) Applicant: Samsung Electronics Co., Ltd., Suwon-si (KR)

(72) Inventor: Keunseob Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/701,878

(22) Filed: Dec. 3, 2019

(65) Prior Publication Data

US 2020/0204677 A1 Jun. 25, 2020

(30) Foreign Application Priority Data

Dec. 19, 2018 (KR) .......................... 10-2018-0165546

(51) Int. Cl.
| | |
|---|---|
| *H04M 1/64* | (2006.01) |
| *H04M 3/436* | (2006.01) |
| *H04M 3/527* | (2006.01) |
| *G10L 15/18* | (2013.01) |
| *G10L 15/22* | (2006.01) |

(52) U.S. Cl.
CPC ....... *H04M 3/4365* (2013.01); *G10L 15/1815* (2013.01); *G10L 15/22* (2013.01); *H04M 3/527* (2013.01); *G10L 2015/223* (2013.01)

(58) Field of Classification Search
CPC . H04M 3/4365; H04M 3/527; G10L 15/1815; G10L 15/22
See application file for complete search history.

(56) References Cited

U.S. PATENT DOCUMENTS

| | | | |
|---|---|---|---|
| 8,085,915 B2 | 12/2011 | Reumann et al. | |
| 9,160,848 B2 | 10/2015 | Kim et al. | |
| 9,986,079 B1 | 5/2018 | Kashimba et al. | |
| 2010/0330964 A1 | 12/2010 | Chen et al. | |
| 2012/0108214 A1* | 5/2012 | Assem | H04W 4/24 455/412.1 |
| 2014/0029734 A1 | 1/2014 | Kim et al. | |
| 2014/0270108 A1 | 9/2014 | Riahi et al. | |

(Continued)

FOREIGN PATENT DOCUMENTS

| | | |
|---|---|---|
| CN | 107331383 A | 11/2017 |
| JP | H08-18649 A | 1/1996 |

(Continued)

OTHER PUBLICATIONS

International Search Report dated Mar. 24, 2020, issued in International Application No. PCT/KR2019/016942.

*Primary Examiner* — Simon King
(74) *Attorney, Agent, or Firm* — Jefferson IP Law, LLP

(57) ABSTRACT

An electronic apparatus is provided. The electronic apparatus includes a communicator, and a processor to, in response to a call request received through the communicator, perform a first telephone conversation with a counterpart making the call request through a voice assistant using an artificial intelligence (AI) model which is learned to generate contents of telephone conversations, and provide a user interface for second telephone conversation between a user of the electronic apparatus and the counterpart based on contents of the first telephone conversation.

20 Claims, 16 Drawing Sheets

(56) References Cited

U.S. PATENT DOCUMENTS

| | | | | |
|---|---|---|---|---|
| 2015/0003595 A1* | 1/2015 | Yaghi | ............... | H04M 3/5175 |
| | | | | 379/85 |
| 2015/0381440 A1* | 12/2015 | Zhao | ............... | H04L 43/062 |
| | | | | 709/204 |
| 2018/0018969 A1* | 1/2018 | Bentitou | ............... | G10L 15/22 |
| 2018/0020093 A1* | 1/2018 | Bentitou | ............... | G10L 13/00 |
| 2018/0054507 A1* | 2/2018 | Bentitou | ............... | H04M 3/527 |
| 2018/0131799 A1* | 5/2018 | Kashimba | ......... | H04M 3/42059 |
| 2018/0249006 A1* | 8/2018 | Dowlatkhah | ......... | H04W 16/18 |

FOREIGN PATENT DOCUMENTS

| | | |
|---|---|---|
| JP | 2017-192005 A | 10/2017 |
| KR | 10-1431596 B1 | 8/2014 |
| KR | 10-2014-0122829 A | 10/2014 |
| KR | 10-2017-0124852 A | 11/2017 |
| KR | 10-1909141 B1 | 10/2018 |
| WO | 2015/077398 A1 | 5/2015 |

\* cited by examiner

HELLO, THIS IS THE VOICE ASSISTANT OF XXX. PLEASE TELL ME WHY YOU CALLED, THEN I WILL PUT YOU THROUGH.

I AM A WATER PURIFIER MANAGER. I WANT TO DISCUSS A SCHEDULE OF VISIT FOR PERIODIC REPLACEMENT OF WATER PURIFIER FILTER.

PLEASE HOLD ON SECONDS, AND I WILL PUT YOU THROUGH TO XXX.

ELECTRONIC APPARATUS, CONTROLLING METHOD OF ELECTRONIC APPARATUS AND COMPUTER READABLE MEDIUM

CROSS-REFERENCE TO RELATED APPLICATION(S)

This application is based on and claims priority under 35 U.S.C. § 119(a) of a Korean patent application number 10-2018-0165546, filed on Dec. 19, 2018, in the Korean Intellectual Property Office, the disclosure of which is incorporated by reference herein in its entirety.

BACKGROUND

1. Field

The disclosure relates to an electronic apparatus providing a user with a telephone conversation service. More particularly, the disclosure relates to an electronic apparatus providing a voice assistant for a call made to a user.

The disclosure relates to an electronic apparatus for providing a recommended sentence using an artificial intelligence (AI) system which simulates a function of a human brain, such as cognition and determination by utilizing machine learning algorithm, such as deep learning and a language model which is learned according to the application of the AI system, and a controlling method thereof.

2. Description of Related Art

In the related art, as the technology for filtering an incoming call which is malicious or commercial, the mechanism of comparing a telephone number corresponding to the received call request with a telephone number included in the database and informing a user has been used.

However, in this case, when a call having the new number not stored in the database is incoming, filtering of the call is not possible. In addition, in order to store information on a specific telephone number in a database, it is required for anyone to directly communicate with a counterpart of the corresponding telephone number, find out a purpose of the call, and record the purpose in a database.

The technology of comparing a conversation pattern, a background sound pattern, and the like of a call with a pre-stored database while a user is performing a call, and notifying a user on a real time basis that the call may be a malicious call has been developed. However, in this case, there is a problem that the user has to make a direct call and if the call time is shorter than the time required to determine whether or not the call is malicious, it is not helpful to the user.

Artificial intelligence (AI) systems are computer systems that implement human level intelligence. Unlike the existing rule-based smart system, the machine learns, determines and becomes smart. The more the AI systems are used, the more the recognition rate is improved. Therefore, a user's taste can be understood more accurately. As a result, existing rule-based smart systems are gradually being replaced by deep learning-based AI systems.

AI technology is composed of machine learning (for example, deep learning) and element technologies that utilize machine learning.

Machine learning is an algorithm technology that classifies or learns the characteristics of input data. Element technology is a technology that simulates functions, such as recognition and determination of human brain using machine learning algorithms, such as deep learning, composed of linguistic understanding, visual understanding, reasoning or prediction, knowledge representation, motion control, and the like.

Various fields in which AI technology is applied are as follows. Linguistic understanding is a technology for recognizing, applying or processing human language or characters and includes natural language processing, machine translation, dialogue system, question & answer, speech recognition or synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge or probability based inference, optimization prediction, preference-based planning, and recommendation. Knowledge representation is a technology for automating human experience information into knowledge data, including knowledge building (data generation or classification) and knowledge management (data utilization). Motion control is a technique for controlling the autonomous running of the vehicle and the motion of the robot, including motion control (navigation, collision, driving), operation control (behavior control), and the like.

For example, the AI system may be used for learning various sentences and generating a language model according to learning results. In addition, a new word may be provided or a new sentence may be completed through a process similar to learning, based on the generated language model.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus providing a voice assistant for a call made to a user.

Another aspect of the disclosure is to provide an electronic apparatus capable of determining a purpose of a received call request without making a direct call by a user or any person, and a controlling method thereof.

Another aspect of the disclosure is to provide an electronic apparatus which, even if a call request is received, does not directly connect a user, but conducts a telephone conversation with a counterpart through a voice assistant using an AI model, and provides contents of the telephone conversation to a user, and a controlling method thereof.

Another aspect of the disclosure is to provide an electronic apparatus which provides a voice assistant service playing a role as a secretary having cognitive ability similar to humans in a circumstance where a call is made to a user, by using the AI model which performs machine learning.

Additional aspects will be set forth in part in the description which follows and, in part, will be apparent from the description, or may be learned by practice of the presented embodiments.

In accordance with an aspect of the disclosure, the electronic apparatus is provided. The electronic apparatus includes a communicator, and at least one processor to, in response to a call request received through the communicator, perform a first telephone conversation with a counterpart making the call request through a voice assistant using an artificial intelligence (AI) model which is trained to generate contents of telephone conversations, and provide a user interface (UI) for second telephone conversation between a user of the electronic apparatus and the counterpart based on the contents of the first telephone conversation.

The electronic apparatus may further include at least one memory to store a list including one or more telephone numbers, and the processor may perform the first telephone conversation with the counterpart through the voice assistant according to whether a telephone number of the counterpart is included in the list.

The processor may, based on the telephone number of the counterpart being included in the list, provide the UI, and based on the telephone number of the counterpart not being included in the list, perform the first telephone conversation with the counterpart through the voice assistant.

The processor may, based on a purpose of the call request obtained based on contents of the first telephone conversation corresponding to a predetermined purpose, terminate the first telephone conversation performed with the counterpart through the voice assistant, and based on the purpose of the call request not corresponding to a predetermined purpose, provide the UI.

The processor may receive a user command to start or reject the second telephone conversation between the user of the electronic apparatus and the counterpart through the UI including summary information regarding the first telephone conversation obtained based on contents of the first telephone conversation performed with the counterpart through the voice assistant.

The processor may, based on a user command to provide the counterpart with a message being input through the UI, provide the counterpart with the message through the voice assistant.

The processor may obtain the summary information by identifying a word of a predetermined type from a voice received from the counterpart during the first telephone conversation performed with the counterpart through the voice assistant and adding the identified word to a prestored sentence including the type of the identified word.

The processor may determine a purpose of the call request based on contents of the first telephone conversation performed with the counterpart through the voice assistant, using the AI model which is trained to determine a purpose of the counterpart for the call request through contents of conversation with the counterpart.

The AI model which may be trained to determine the purpose of the counterpart of the conversation, is trained based on contents of the first telephone conversation performed with the counterpart through the voice assistant and a purpose of the call request which is input by the user after the second telephone conversation between the user of the electronic apparatus and the counterpart is terminated.

The processor may determine the purpose of the call request based on at least one of whether the counterpart utters a predetermined word or sentence during the first telephone conversation performed with the counterpart through the voice assistant, whether information on the user uttered by the counterpart is genuine, or context information of the contents of the first telephone conversation.

In accordance with another aspect of the disclosure, a controlling method of an electronic apparatus is provided. The method includes in response to a call request received through the communicator, performing a first telephone conversation with a counterpart making the call request through a voice assistant using an AI model which is trained to generate contents of telephone conversations, and providing a UI for second telephone conversation between a user of the electronic apparatus and the counterpart based on the contents of the telephone conversation.

The method may further include identifying whether a telephone number of the counterpart is included in a prestored list, and the performing the first telephone conversation with a counterpart making the call request through the voice assistant may include, based on the telephone number of the counterpart not being included in the prestored list, performing the first telephone conversation with the counterpart making the call request using the voice assistant.

The method may further include, based on a purpose of the call request obtained based on contents of the first telephone conversation corresponding to a predetermined purpose, terminating the first telephone conversation performed with the counterpart through the voice assistant, and the providing a UI for second telephone conversation between the user and the counterpart may include, based on the purpose of the call request not corresponding to a predetermined purpose, providing the UI for the second telephone conversation between the user and the counterpart.

The method may further include obtaining summary information on the first telephone conversation performed with the counterpart through the voice assistant based on contents of the first telephone conversation, and the providing the UI may include outputting the UI which includes the obtained summary information and which is for receiving a user command to start or reject the second telephone conversation between the user and the counterpart.

The method may further include, based on a user command to provide the counterpart with a message being input through the UI, providing the counterpart with the message through the voice assistant.

The obtaining of the summary information may include generating the summary information by identifying a word of a predetermined type from a voice received from the counterpart during the first telephone conversation performed with the counterpart through the voice assistant and adding the identified word to a prestored sentence including the type of the identified word.

The method may further include determining a purpose of the call request based on contents of the first telephone conversation performed with the counterpart through the voice assistant, using the AI model which is trained to determine a purpose of the counterpart for the call request through contents of telephone conversations with the counterpart.

The method may further include training the AI model which is trained to determine the purpose of the counterpart through conversation with the counterpart, based on a purpose of the call request which is input by the user after the second telephone conversation between the user of the electronic apparatus and the counterpart is terminated.

The method may further include determining the purpose of the call request based on at least one of whether the counterpart utters a predetermined word or sentence during the first telephone conversation performed with the counterpart through the voice assistant, whether information on the user uttered by the counterpart is genuine, or context information of the contents of the first telephone conversation.

In accordance with another aspect of the disclosure, at least one non-transitory computer readable medium storing computer instructions executed by a processor of an electronic apparatus to cause the electronic apparatus is provided. The at least one non-transitory computer readable medium performs steps including, in response to a call request received through the communicator, performing a first telephone conversation with a counterpart making the call request through a voice assistant using an AI model which is trained to generate contents of telephone conversations, and providing a UI to make second telephone conversation between a user of the electronic apparatus and the counterpart based on the contents of the telephone conversation.

The electronic apparatus according to the disclosure may determine the purpose of the call request by itself as a result of the voice assistant performing the telephone conversation instead of notifying the user when the call request of the unknown number is received.

In addition, it is possible to selectively notify the user that the call request has been received according to the determined purpose, thereby preventing the inconvenience of the user who has to receive the advertising call or the spam call.

The electronic apparatus according to the disclosure provides a UI that summarizes the contents of a telephone communication preemptively performed by the voice assistant and enables the user to select whether to accept a call request, and even if a call request of an unknown telephone number is received, the user may directly determine whether to accept the call while knowing the purpose.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
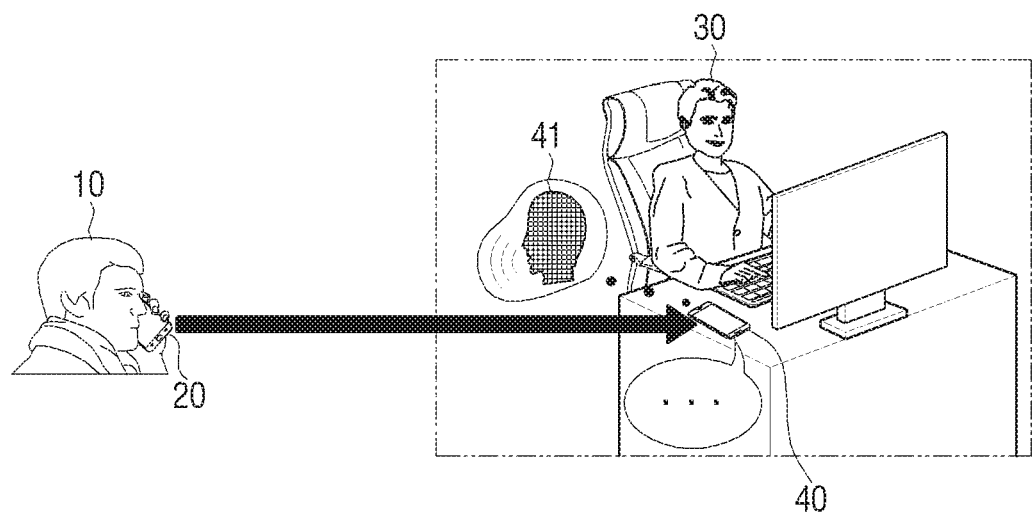
FIG. 1 illustrates an operation of an electronic apparatus in general according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Certain embodiments are described below with reference to the accompanying drawings.

The terms used in the present disclosure and the claims are general terms identified based on the functions of the various embodiments of the disclosure. However, these terms may vary depending on intention, legal or technical interpretation, emergence of new technologies, and the like of those skilled in the related art. In addition, there may be some terms arbitrarily identified by an applicant. Unless there is a specific definition of a term, the term may be construed based on the overall contents and technological common sense of those skilled in the related art.

Further, like reference numerals indicate like components that perform substantially the same functions throughout the specification. For convenience of descriptions and understanding, the same reference numerals or symbols are used and described in different exemplary embodiments. In other words, although elements having the same reference numerals are all illustrated in a plurality of drawings, the plurality of drawings do not mean one exemplary embodiment.

In embodiments of the disclosure, relational terms, such as first and second, and the like, may be used to distinguish one entity from another entity, without necessarily implying any actual relationship or order between such entities. In embodiments of the disclosure, relational terms, such as first and second, and the like, may be used to distinguish one entity from another entity, without necessarily implying any actual relationship or order between such entities. If necessary, each ordinal number may be used interchangeably.

A singular expression includes a plural expression, unless otherwise specified. It is to be understood that the terms, such as "comprise" or "consist of" are used herein to designate a presence of characteristic, number, operation, element, component, or a combination thereof, and not to preclude a presence or a possibility of adding one or more of other characteristics, numbers, operations, elements, components or a combination thereof.

In embodiments of the disclosure, a "module" or a "unit" may perform at least one function or operation, and be implemented as hardware or software, or as a combination of hardware and software. Further, except for the "module" or the "unit" that has to be implemented as particular hardware, a plurality of "modules" or a plurality of "units" may be integrated into at least one module and implemented as at least one processor.

In the disclosure, 'at least one of a, b or c' means 'only a, only b, only c, both a and b, both a and c, both b and c, all of a, b, and c, or variations thereof'.

FIG. 1 illustrates an operation of an electronic apparatus in general according to an embodiment of the disclosure.

Referring to FIG. 1, when a counterpart 10 makes a call to a mobile phone 40 of a user 30 through a mobile phone 20, the mobile phone 40 may perform a call connection with the mobile phone 20 without notifying the user 30 that a call is received, and may perform telephone conversation with the counterpart 10 using a voice assistant 41 using the AI model which is trained to generate contents of (telephone) conversation.

The mobile phone 40 may determine what is a purpose of the call of the counterpart 10 to the user 30 using contents of the telephone conversation between the voice assistant 41 and the counterpart 10. When the purpose is not for an advertisement or a crime, the mobile phone 40 may inform the user 30 that a call is received from the counterpart 10.

The mobile phone 40 may provide the user 30 with contents of the telephone conversation between the voice assistant 41 and the counterpart 10.

After confirming the contents of the telephone conversation, the user 30 may perform a call with the counterpart 10 (mobile phone 20) through the mobile phone 40.

Figure 2:
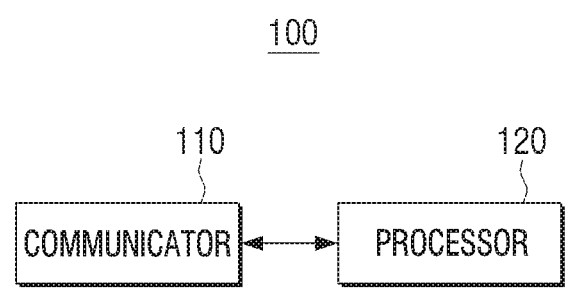
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

An electronic apparatus 100 may be implemented as a mobile phone, a smartphone, a wired telephone, an Internet telephone, a tablet PC, a notebook PC, a desktop PC, an interphone, or the like.

Referring to FIG. 2, the electronic apparatus 100 may include a communicator 110 and at least one processor 120.

The communicator 110 is a configuration for transceiving a signal/data with one or more external devices.

When data communication is performed with an external device by wired communication method, the communicator 110 may be connected to a coaxial cable, an optical fiber cable, and the like for communication. For example, a local area network (LAN) may be used.

When performing data communication with an external device using a wireless communication method, the communicator 110 may include at least one of W-Fi Direct communication module, a Bluetooth module, an infrared data association (IrDA) module, a near field communication (NFC) module, Zigbee module, cellular communication module, third generation (3G) mobile communication module, fourth generation (4G) mobile communication module, or a fourth generation long term evolution (LTE) communication module.

The communicator 110 may include an antenna, a demodulator, an equalizer, and the like, in order to receive a broadcast signal. The communicator 110 may also include a global positioning system (GPS) module for receiving a GPS signal from a GPS satellite and detecting the current position of the electronic apparatus 100.

The communicator 110 may receive a call request from one or more external devices (not shown). The communicator 110 may be connected with an external device and transceiver an audio signal. To this end, the communicator 110 may include a telephony manager (not shown) for receiving a call request through a communication module.

The processor 120 may control overall operations of the electronic apparatus 100.

To this end, the processor 120 may include a random access memory (RAM) (not shown), a read only memory (ROM) (not shown), a central processing unit (CPU) (not shown), a graphical processing unit (GPU) (not shown), a system bus (not shown), and the like, and may perform operations or data processing on the control of other components included in the electronic apparatus 100.

In response to a call request received through the communicator 110, the processor 120 may perform telephone conversation through the voice assistant using an artificial intelligence (AI) model which is trained to generate contents of telephone conversation.

The AI model trained to generate contents of telephone conversation may be trained to generate a sentence corresponding to a first sentence for starting a call, or to generate a sentence following the sentence uttered by the counterpart. To this end, the model may be trained using a database including various contents of telephone conversation, or use recurrent neural network (RNN) which is a learning method that sequentially and additionally considers data which is input according to time flow in generating contents of telephone conversation subsequent to the contents of telephone conversation of the counterpart.

The AI model trained to generate the contents of the telephone conversation may be stored in a memory (not shown) of the electronic apparatus 100, but may be stored in a server (not shown) and used for the operation of the electronic apparatus 100.

The processor 120 may control the communicator 110 to perform a call connection with an external device (not shown) of the counterpart that made the call request. The processor 120 may control the communicator 110 to transmit the voice data corresponding to the contents of the telephone conversation generated using the AI model to an external device (not shown) of the counterpart that made the call request. At this time, the voice data may have predetermined feature information, and the voice data may be provided to the counterpart as a voice having the feature information, that is, the voice of the voice assistant.

The feature information may correspond to various parameter which is acquired by digitization and frequency conversion and the like for the voice, such as the pitch of the voice, format, linear predictive cepstral coefficient (LPCC), the mel-frequency cepstral coefficient (MFCC), perceptual linear predictive (PLP), or the like.

As a result, a voice of the voice assistant may be provided to the counterpart who made a call request, and the electronic apparatus 100 may perform a call with the counterpart through the voice assistant. At this time, the user of the electronic apparatus 100 has not yet been informed of the call request.

The operations of generating contents of the telephone conversation by using the AI model to make a call with the counterpart who has made a call request and transmitting voice data corresponding to the generated contents of the telephone conversation to an external device (not shown) of the counterpart may be defined as an operation of the voice assistant.

Meanwhile, in the above-described embodiments, the voice assistant has been described as an object or service for generating contents of the telephone conversation through the AI model and conducting telephone conversation with the counterpart according to the generated contents of the telephone conversation. However, it may be defined that the voice assistant has more diverse roles.

For example, the electronic apparatus 100 may determine the purpose of the call request using the contents of the telephone conversation between the voice assistant and the counterpart, provide a user with the summary information about the contents of the telephone conversation, and provide an user interface for a telephone conversation between the user and the counterpart (this will be described later). These various embodiments may also be defined as a service or operation of the voice assistant.

In this case, the voice assistant may be defined as the AI system which performs various operations of the electronic apparatus 100 using at least one of the AI model trained to determine a purpose of the counterpart of the call through the contents of the telephone conversation or an AI model trained to summarize a text (contents of the telephone conversation) as well as the AI model trained to generate contents of telephone conversation, and as a comprehensive AI service, which provides a user with a call assistant service equivalent to cognitive ability of human.

Hereinbelow, in order to describe the operations of the electronic apparatus 100 in a technical aspect, only the operations of generating contents of the telephone conversation and performing a call with the counterpart using the generated contents of telephone conversation of the electronic apparatus 100 are considered as a role of the voice assistant. Other operations will be described centering on the technology through each configuration of the electronic apparatus 100.

Unlike FIG. 2, the electronic apparatus 100 may further include a memory (not shown). At this time, a list including one or more telephone numbers may be stored in the memory.

In this case, the processor 120 may perform a call with the counterpart through the voice assistant depending on whether the telephone number of the counterpart that made the call request is included in the list.

The stored list may correspond to a white list including a phone number, such as a family, a friend, and an acquaintance of the user.

At this time, if the phone number of the counterpart is not included in the stored list, the processor 120 may control the communicator 110 to connect a call with an external device of the counterpart and perform a telephone conversation with the counterpart through the voice assistant.

When the phone number of the counterpart is included in the stored list, the processor 120 may not perform a telephone conversation with the counterpart through the voice assistant, and directly provide a user interface (UI) for telephone conversation between the user and the counterpart.

The UI for the telephone conversation between the user and the counterpart may inform the user that a call request has been received from the counterpart. In addition, a user command to select whether to start or reject a call (in which the user performs telephone conversation with the counterpart) with the counterpart may be input (received) through the UI. The UI for the telephone conversation between the user and the counterpart may be output visually or auditorily through a display (not shown) of the electronic apparatus 100 or a voice outputter (not shown) of the electronic apparatus 100.

The interface for telephone conversation between the user and the counterpart will be described with reference to FIG. 5.

Figure 3:
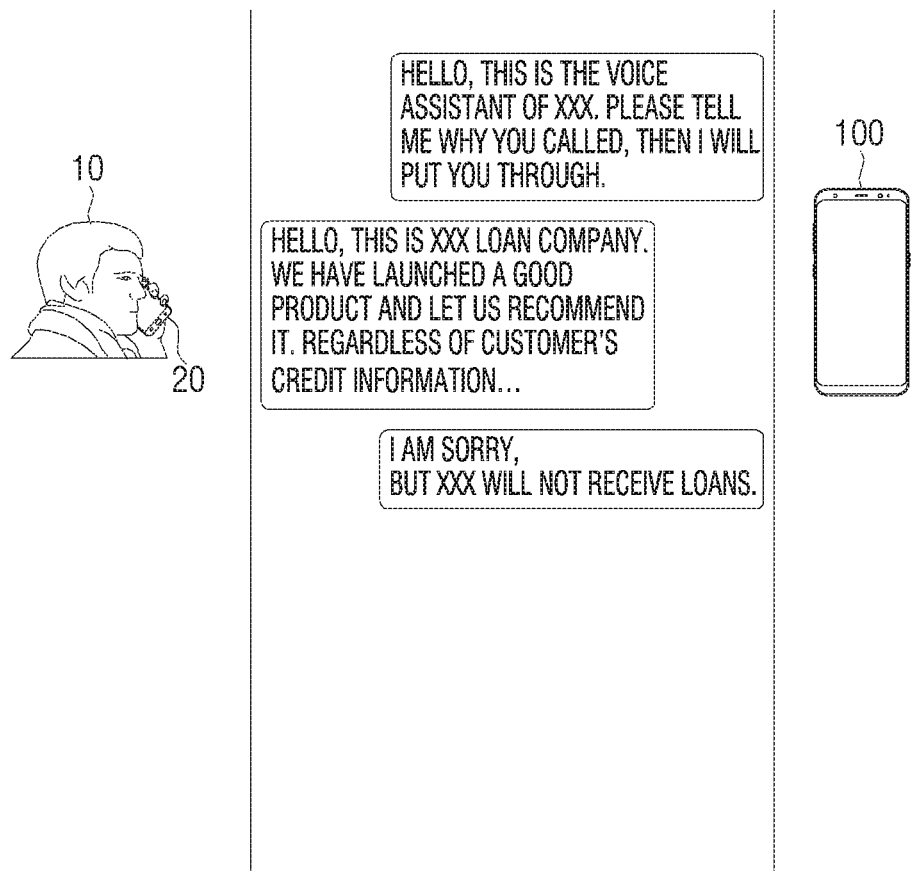
FIG. 3 illustrates an operation of performing a telephone conversation between a voice assistant and a counterpart according to an embodiment of the disclosure.
Figure 4:
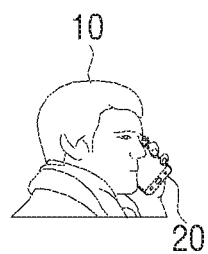
FIG. 4 illustrates an operation of performing a telephone conversation between a voice assistant and a counterpart according to an embodiment of the disclosure.
Figure 4:

FIGS. 3 and 4 illustrate operations of performing a telephone conversation between a voice assistant and a counterpart, as an electronic apparatus is connected to an external device of the counterpart according to various embodiments of the disclosure. At this time, the processor 120 may perform the telephone conversation through the voice assistant using the purpose of the call request obtained from the contents of the telephone conversation between the voice assistant and the counterpart.

The telephone conversation between the voice assistant and the counterpart 10 as illustrated in FIGS. 3 to 4 may be a result of not including the telephone number of the counterpart who has made a call request in the list storing the telephone number.

Referring to FIG. 3, the voice assistant of the electronic apparatus 100, by using the AI model trained to generate contents of telephone conversation, may say "Hello, this is the voice assistant of XXX (for example: username). Please tell me why you called, then I will put you through".

Referring to FIG. 3, in response to the voice of the voice assistant, the counterpart 10 answers "Hello, this is XXXX Loan Company. We have launched a good product and let us recommend it. Regardless of customer's credit information . . ."

At this time, the electronic apparatus 100 or the server (not shown) which is capable of communicating with the electronic apparatus 100 may determine that the purpose of the call request is "loan advertisement" using the contents which the counterpart 10 uttered. In this case, the processor 120 may use various mechanisms for determining the purpose of a call request or using a trained AI, and a detailed description thereof will be described later.

Thereafter, the electronic apparatus 100 uses the AI model trained to generate contents of telephone conversation and the result of determining that the purpose of the call request is "loan advertisement", and may generate the sentence "I am sorry, but XXX will not receive loans," showing an intention to reject, and transmit the sentence to the counterpart as the voice of the voice assistant.

The electronic apparatus 100 may end the call connection with the external device 20 of the counterpart 10.

Referring to FIG. 4, the voice assistant of the electronic apparatus 100 may say, "Hello, this is the voice assistant of XXX (for example: username). Please tell me why you called, then I will put you through" in the same manner as FIG. 3.

Referring to FIG. 4, in response to the voice of the voice assistant, the counterpart 10 may say, "Hello, I am a water purifier manager. I want to discuss a schedule of visit for periodic replacement of water purifier filter."

The electronic apparatus 100 or a server (not shown) which may communicate with the electronic apparatus 100 may determine that the purpose of the call request is for "replacement of a water purifier filter", using the contents of the telephone conversation, that is, what the counterpart 10 uttered.

Thereafter, the electronic apparatus 100 uses the AI model trained to generate the contents of the telephone conversation and the result of determining that the purpose of the call request is "replacement of a water purifier filter", and may transmit the sentence, "Please hold on seconds, and I will put you through to XXX" to the counterpart as the voice of the voice assistant.

The electronic apparatus 100 may then provide a UI for telephone conversation between the user of the electronic apparatus 100 and the counterpart 10.

The processor 120 may provide a UI for communication between the user of the electronic apparatus 100 and the counterpart based on the contents of the telephone conversation made with the counterpart through the voice assistant.

At this time, the processor 120 may provide a UI for a telephone conversation between the user of the electronic apparatus 100 and the counterpart according to the purpose of the call request acquired according to the content of the telephone conversation made with the counterpart through the voice assistant.

The purpose of a call request may be determined through the electronic apparatus 100 and/or a server (not shown) that may communicate with the electronic apparatus 100. Hereinafter, it will be assumed that the processor 120 of the electronic apparatus 100 determines the purpose of the call request.

The processor 120 may determine a purpose of the call request based on the contents of the telephone conversation performed with the counterpart through the voice assistant, by using the AI model trained to determine a purpose of the counterpart for the call request through contents of telephone conversation with the counterpart.

The AI model trained to determine the purpose of the counterpart may be trained using a plurality of conversations and database including the purposes corresponding to respective conversations. At this time, the plurality of conversations included in the database can be conversations included in various contents of telephone conversation, and the AI model may be trained through a deep neural network (DNN) method.

For example, the AI model may be trained using a content of telephone conversation for various advertisement purposes, a content of telephone conversation for criminal purposes, such as voice phishing, a content of telephone conversation between ordinary acquaintances, a formal content of telephone conversation, and the like.

When the user performs a call directly with the counterpart, the AI model trained to determine the purpose of the counterpart may be trained by using a result received directly from the user who has finished the call about what is the purpose of the call request. The related specific embodiment will be described later with reference to FIG. 9.

The processor 120 may determine the purpose of the call request based on various mechanisms. Hereinbelow, specific mechanisms for determining the purpose of the call request will be described by using the contents of the telephone conversation performed with the counterpart through the voice assistant. The following mechanisms may be performed by one or more AI models as the AI model which is trained to determine the purpose of counterpart through contents of telephone conversation.

As one mechanism, the processor 120 may determine the purpose of the call request according to whether the counterpart has uttered a predetermined word or sentence during a call performed with the counterpart through the voice assistant. Specifically, it is possible to identify whether a predetermined word or sentence is included in contents of telephone conversation of the counterpart among the contents of the telephone conversation between the counterpart and the voice assistant.

For example, if the counterpart speaks a word, such as "loan" and "event" or a sentence "Do you need loans?", the processor 120 may determine that the purpose of the call request is "advertisement" or "loan advertisement."

As one mechanism, the processor 120 may determine the purpose of the call request according to whether the information about the user of the electronic apparatus 100 that the counterpart has uttered during the communication with the counterpart through the voice assistant is genuine. Specifically, when information on the user is included in contents of telephone conversation of the counterpart among contents of the telephone conversation between the counterpart and the voice assistant, the user information may be compared with pre-stored information of the user. If the information about the user included in the contents of the telephone conversation of the counterpart is different from the pre-stored information of the user, the processor 120 may determine that the purpose of the call request is "fraud" or "voice phishing."

For example, according to the pre-stored information of the user, in the case where a user is not married, but if the counterpart speaks that "your spouse is in danger," the processor 120 may determine that the purpose of the call request is "voice phishing."

As one mechanism, the processor 120 may determine the purpose of the call request based on context information of the contents of the telephone conversation performed with the counterpart through the voice assistant. Specifically, the processor 120 may determine from the contents of the telephone conversation whether the counterpart speaks or behaves appropriately for the context or situation of the telephone conversation.

To do this, the type of a conversation expected to be spoken by situations is pre-stored, and whether the content of the content of telephone conversation of the counterpart is similar (or matched) to the pre-stored type for each situation in the call between the voice assistant and the counterpart may be determined.

The following table 1 shows an example of determining whether the context information or behavior of the subsequent content of telephone conversation of the counterpart matches (similarity) the preset content of telephone conversation or behavior, by using the context information of the current telephone conversation and contents of the telephone conversation of the voice assistant.

TABLE 1

| Situation | Contents of the telephone conversation or behavior of the counterpart | Similarity |
| --- | --- | --- |
| (No Context) | (Any Context) | O |
| (No Context) (question) | (Any Context) | O |
| (CC Context) (question) | Termination of a call | X |
| (AA Context) (question) | (AA Context) | O |
| (AA Context) (question) | (CC Context) | X |
| (AA Context) (question) | Termination of a call | X |

Referring to the first of the six situations of table 1, while there is no context information (No Context), that is, there is no content of the telephone conversation, if the voice assistant has not said a word, no matter what word the counterpart speaks, the context of the contents of the telephone conversation may be determined to be normal (similarity: O).

Referring to the third example, when the voice assistant asks a question regarding a specific content (CC context), in the case when the counterpart says about the content (CC context) as well, it will be determined that the context information is correct. Therefore, if the counterpart terminates a call immediately without saying a word, it may be determined that the context of the telephone conversation is abnormal (similarity: X).

Referring to the fifth, even though the voice assistant has asked a question regarding the AA context, the counterpart says a word regarding CC context instead of AA context, it may be determined that the context of the telephone conversation is abnormal (similarity: X).

As such, the processor 120 may determine that the purpose of the call request is not malicious or abnormal, only when the counterpart says a word or behaves suitably for the context information or the situation of the telephone conversation.

In the meantime, one of the above-described embodiments for determining the purpose of a call request may be used, or two or more of the embodiments in combination may be used. For example, one or at least two of the above-described embodiments may be used simultaneously, and the order in which the mechanisms described above are performed may be varied. In addition, the embodiment is not limited to the case of using the AI model trained to determine the purpose of the above-mentioned mechanisms and the counterpart, and may be implemented in various embodiments.

When the purpose of the call request obtained based on the content of the telephone conversation corresponds to a predetermined purpose, the processor 120 may terminate the telephone conversation performed with the counterpart through the voice assistant. Specifically, the processor 120 may terminate the telephone conversation between the voice assistant and the counterpart without notifying the user of a call request at all.

At this time, the predetermined purpose may include an advertisement purpose or a malicious purpose, and spam, voice phishing, and the like may be included. In addition, one or more purposes for which a user does not want to make a call may be included according to a request of the user. In addition, "unclear purpose" may be included, if a definite purpose may not be identified.

In the meantime, if the purpose of the call request does not correspond to the predetermined purpose, the processor 120 may provide a UI for a call between the user of the electronic apparatus 100 and the counterpart.

The UI may include notification information on the received call request.

The processor 120 may receive a user command regarding whether to start a call with the counterpart from the user of the electronic apparatus 100 through the UI.

For this, the UI may be displayed by including a UI each of which corresponds to starting of a call or rejecting a call.

Alternatively, the UI may include a visual or auditory guide that indicates contents of the user's utterance corresponding to starting or rejecting a call, respectively. As a result, the electronic apparatus 100 may recognize the utterance contents of the user from a voice and start or reject a call between the user and the counterpart.

In addition, the UI may include summary information about a call obtained based on the content of the telephone conversation performed between the counterpart and the voice assistant. As a result of providing summary information regarding the content of the telephone conversation between the voice assistant and the counterpart by the electronic apparatus 100, the user may have the effect to start or reject a call with the counterpart based on the summarized content of the telephone conversation.

The processor 120 may receive a user command to provide a message to the counterpart through the UI.

Specifically, the processor 120 may receive at least one of a user command for starting creation of a message to be provided to the counterpart, a user command for inputting at least one text, or a user command to provide the counterpart with the input text as a format, such as a touch, voice, motion, and the like.

At this time, the processor 120 may control the communicator 110 to transmit voice data corresponding to at least one text input according to a user command to an external device (not shown) of the counterpart. For example, the processor 120 may provide a message corresponding to the text input according to a user command to the counterpart through the voice assistant during a conversation between the voice assistant and the counterpart. This corresponds to the form in which the voice assistant transmits the user's message to the user on behalf of the user.

Figure 5:
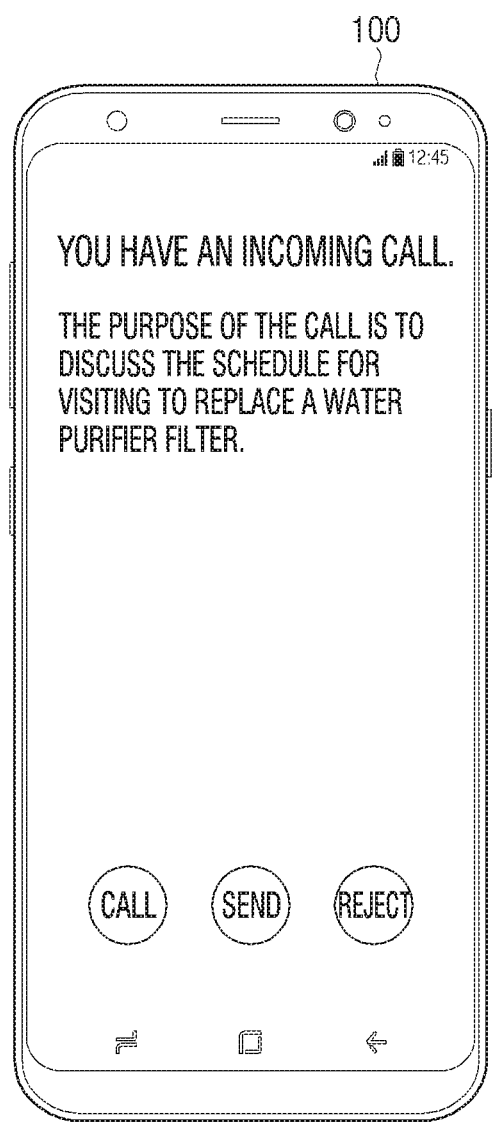
FIG. 5 illustrates an embodiment of providing summary information of contents of telephone conversation between a voice assistant and a counterpart and user interface (UI) for telephone conversation between a user of an electronic apparatus and the counterpart according to an embodiment of the disclosure.

FIG. 5 illustrates an embodiment of providing summary information of contents of telephone conversation between a voice assistant and a counterpart and a UI for telephone conversation between a user of an electronic apparatus and the counterpart according to an embodiment of the disclosure.

FIG. 5 may indicate a case in which the telephone number corresponding to the received call request is not included in the pre-stored list. This case corresponds to the case as FIG. 4 in which the purpose of the call request is not malicious purpose or advertisement purpose, but a general purpose, such as replacement of the filter of the water purifier.

Referring to FIG. 5, the electronic apparatus 100 may provide a notification of the received call request through a sentence, "you have an incoming call."

Referring to FIG. 5, the electronic apparatus 100 may receive a user command for selecting at least one of "call", "send", and "reject" in a touch or voice form, to start direct call between the user and the counterpart, execute a function for sending a message, or reject a direct call between the user and the counterpart.

Referring to FIG. 5, through the sentence, "the purpose of the call appears to discuss the schedule for visiting to replace a water purifier filter," it may be confirmed that the summary information which summarizes the contents of the telephone conversation performed with the counterpart through the voice assistant is provided.

The summary information on the telephone conversation performed with the counterpart through the voice assistant may be acquired through the electronic apparatus 100 and/or a server (not shown). Hereinbelow, the case of acquiring summary information by the processor 120 of the electronic apparatus 100 is assumed to describe an embodiment of the process to acquire the summary information.

According to a summary algorithm of the disclosure, the processor 120 may identify a predetermined type of word in the voice received from the counterpart during a call made with the counterpart through the voice assistant, add the identified word to the pre-stored sentence, and acquire summary information. At this time, the predetermined type may correspond to various contents for describing the purpose of the counterpart, such as a brand, a purpose, a speaker, a time, and a place, and the like.

This considers that, although there have been various algorithms that summarize one or more sentences in the related art, since the contents of each telephone conversation are relatively short, algorithms of the related art are not always useful.

Figure 6:
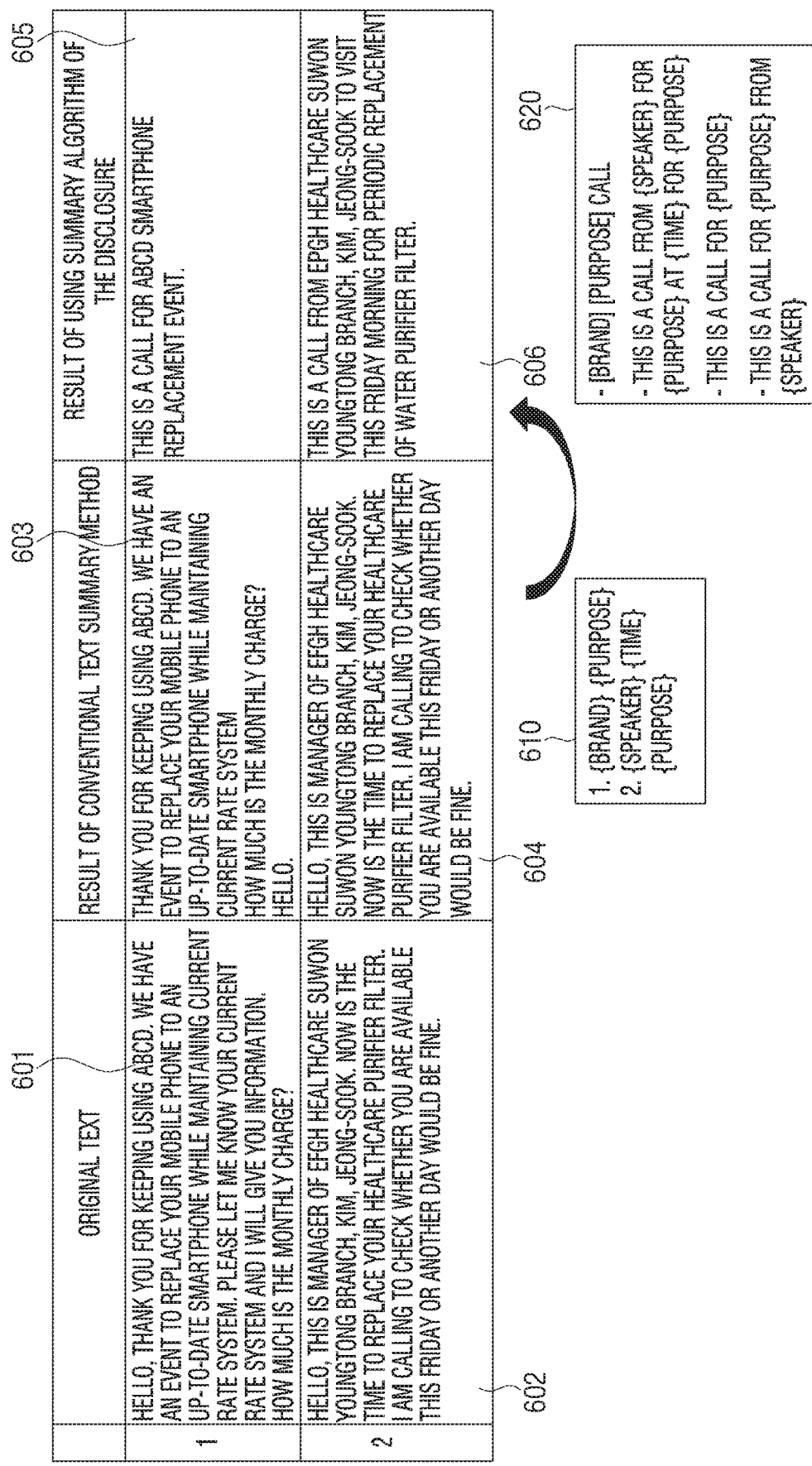
FIG. 6 illustrates a process for acquiring summary information on contents of a telephone conversation between a voice assistant and a counterpart according to an embodiment of the disclosure.

FIG. 6 illustrates a process for acquiring summary information on contents of a telephone conversation between a voice assistant and a counterpart according to an embodiment of the disclosure.

FIG. 6 illustrates an example of additionally considering the summary method of the disclosure, in addition to applying a text summary scheme of the related art, with respect to two same original texts 601 and 602. At this time, in the text summary method of the related art, the algorithm scheme of "the sentence unit separation—word class tagging—deletion of a stop word—extraction of a noun unit—calculation of a weight of a word" is used.

Referring to FIG. 6, referring to the results 603 and 604 which summary two original texts 601 and 602 according to a text summary method of the related art, it can be seen that the amount of text is not significantly reduced. Although essential parts remain by deleting a stop word and so on, in general, most of the content of the telephone conversation between the voice assistant and the counterpart has already included key contents in a high proportion.

Therefore, the summary algorithm of the disclosure needs to be used to implicitly provide only the purpose of a call request from the content of the telephone conversation.

Referring to FIG. 6, the processor 120 may identify a predetermined type of word in results 603, 604 according to a text summarization scheme of the related art. Accordingly, from the result 603 summarizing the first original text 601 in a manner of the related art, it is possible to identify "ABCD" and "smartphone replacement event" corresponding to "brand" and "purpose". From the result 604 summarizing the second original text 602 in the manner of the related art, the "EFGH healthcare manager Suwon Youngtong Branch Kim Jung Sook" which corresponds to the "speaker", "this Friday morning" which corresponds to "time," and "period for periodic filter replacement" and "visit schedule confirmation" which correspond to "purpose" may be identified.

Through a box 610, types corresponding to the words of the preset type identified from each result 603 and 604 using the summary scheme of the related art is listed.

A box 620 represents pre-stored sentences. There may be more diverse sentences, in addition to the sentences in the box 620.

Referring to box 620, the processor 120 may re-summarize the summary result 603 using the sentence "it is a call {brand} {purpose}" including only the types corresponding to the words identified from the summary result 603, from among the pre-stored sentences. To be specific, as a result of adding the identified word to each type position of the sentence in a corresponding manner, a summary sentence 605, "ABCD, smartphone replacement event call" may be acquired.

Referring to the box 620, processor 120 may re-summarize the summary result 604 using the sentence "this is a call from {speaker}, for {purpose}, at {time}" including only the types corresponding to the words identified from the summary result 604, from among the pre-stored sentences. To be specific, as a result of adding the identified word to each type position of the sentence in a corresponding manner, a summary sentence 606, 'from healthcare manager Suwon Youngtong Branch Kim Jung Sook', for 'periodic replacement of a filter of a water purifier,' 'this Friday morning,' 'visiting schedule confirmation call' may be acquired.

In FIG. 6, the summary algorithm of the disclosure is applied for one or more summarizing of the original text using the summary scheme of the related art, but it is also possible to directly apply the summary algorithm to the original text.

Referring to FIG. 5, the processor 120 may receive a user command for selecting "send" through a UI, and then provide a UI for creating a message to be provided to the counterpart through the voice assistant.

Figure 7:
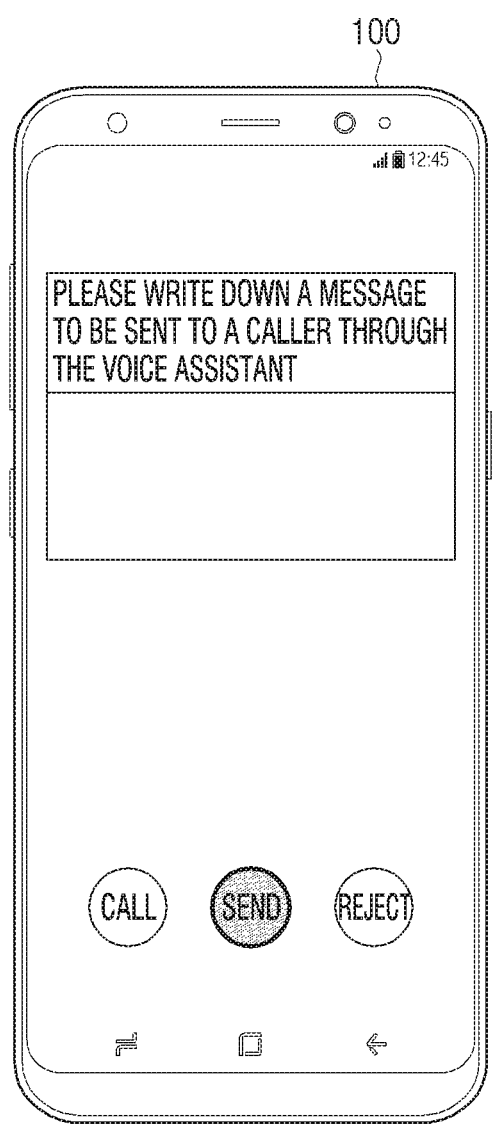
FIG. 7 illustrates an embodiment of providing a UI to generate a message to be provided to a counterpart through a voice assistant according to an embodiment of the disclosure.

FIG. 7 illustrates an embodiment of providing a UI to generate a message to be provided to a counterpart through a voice assistant according to an embodiment of the disclosure.

Referring to FIG. 7, it is assumed that the user command to select "send" of FIG. 5 is input.

Referring to FIG. 7, the electronic apparatus 100 may display a sentence "please write down a message to be sent to a caller through the voice assistant," and display a text which is input through the user command.

Referring to FIG. 7, after at least one message is written, when a user command for selecting a "send" is input through a touch or a voice, the electronic apparatus 100 may provide the written message to the counterpart through the voice assistant.

Figure 8:
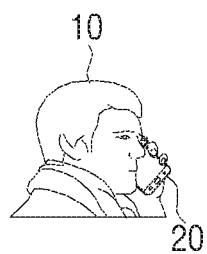
FIG. 8 illustrates contents of a telephone conversation of a voice assistant to provide a message to a counterpart according to a user command according to an embodiment of the disclosure.
Figure 8:

FIG. 8 illustrates contents of a telephone conversation of a voice assistant to provide a message to a counterpart according to a user command according to an embodiment of the disclosure. In FIG. 8, a situation that the user writes down a message "please call back after one hour" and selects "send" of FIG. 7.

Referring to FIG. 8, the electronic apparatus 100 delivers a speech, "dear manager, XXX wishes to deliver a message for you to call back one hour later" to the counterpart through the voice assistant.

Meanwhile, in relation to the embodiment for determining the purpose of the call request, the AI model which is trained to determine the purpose of the counterpart may be trained based on a purpose of the call request input from the user after the call (telephone conversation) between the user and the counterpart of the user is terminated, and the contents of the telephone conversation performed with the counterpart through the voice assistant.

For example, it is assumed that the purpose of a call request is obtained according to the content of a call performed with the counterpart through the voice assistant, a UI for a call between the user and the counterpart is provided since the purpose is not a predetermined purpose, and call between the user and the counterpart is performed as a result of inputting a user command to start the call with the counterpart. In this case, the electronic apparatus 100 or a server (not shown) may determine the purpose of the call request from the contents of the telephone conversation performed with the counterpart through the voice assistant, but it is necessary to receive feedback from the user in order to determine whether the determination is correct. To this end, what is the purpose of the call request may be inputted again from the user after the call between the user and the counterpart is terminated.

Figure 9:
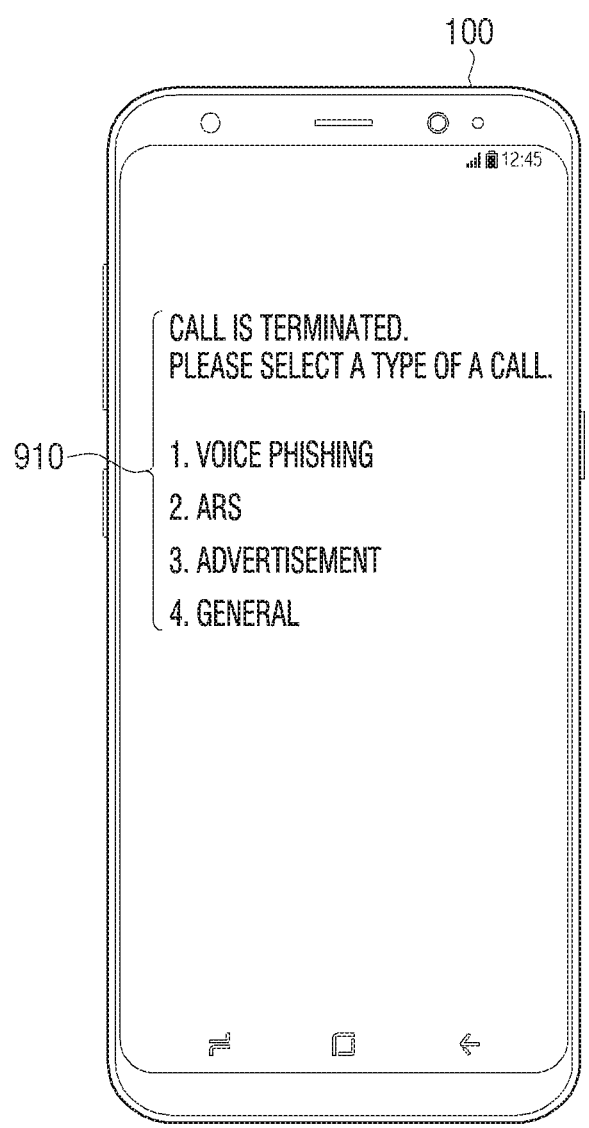
FIG. 9 illustrates an embodiment of outputting a UI to receive a purpose of a call request of a counterpart from a user making a direct call with the counterpart to cause an AI determining a purpose of the call request to learn according to an embodiment of the disclosure.

FIG. 9 illustrates an embodiment of outputting a UI to receive a purpose of a call request of a counterpart from a user making a direct call with a counterpart to cause an AI determining a purpose of the call request to learn according to an embodiment of the disclosure.

Referring to FIG. 9, the electronic apparatus 100 may confirm that a UI 910 for receiving the purpose of the call request of the counterpart after the end of the call between the user and the counterpart is outputted. Then, the AI model may be trained using the contents of the telephone conversation between the voice assistant and the counterpart and the purpose of the call request inputted from the user.

Figure 10:
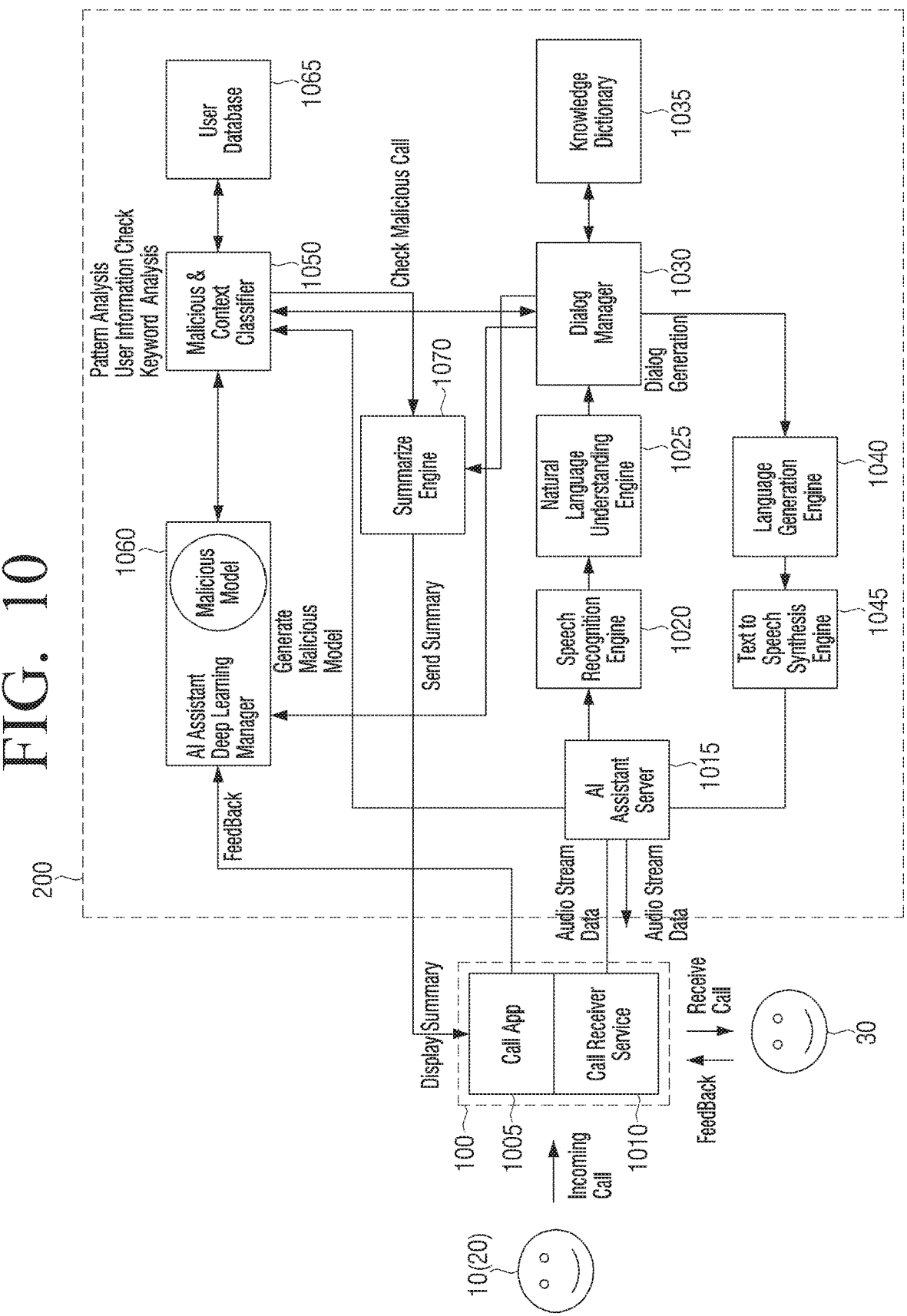
FIG. 10 is a block diagram illustrating a system configuration and an operation of an electronic apparatus and a cloud server when using by the electronic apparatus one or more AI models stored in the cloud server according to an embodiment of the disclosure.

FIG. 10 is a block diagram illustrating a system configuration and an operation of an electronic apparatus and a cloud server when using by the electronic apparatus one or more AI models stored in the cloud server according to an embodiment of the disclosure.

Referring to FIG. 10, when a call request is received from the external device 20 of the counterpart 10 through a call application 1005, a call receiver service application 1010 causes the external device 20 and the AI assistant server 1015 within the cloud server 200 to exchange audio stream data and to perform a call between the voice assistant and the counterpart 10.

The audio stream data which is transmitted to the external device 20 via the call receiver service 1010 from the AI assistant server 1015, that is, the contents of the telephone conversation during the call of the voice assistant may be a result from that the audio stream data corresponding to the content of the telephone conversation during the call is transmitted from the external device 20 to the cloud server 200 via the call receiver service application 1010, and then, the audio stream data goes through a speech recognition engine 1020, natural language understanding engine 1025, dialog manager 1030, language generation engine 1040, a text to speech synthesis engine 1045, and the like.

Specifically, when the audio stream data is converted into word data through the speech recognition engine 1020, the natural language understanding engine 1025 may identify data matched to the converted word data. The dialog manager 1030 may then use the identified data to obtain data following the identified data. To this end, the dialog manager 1030 may utilize the AI model trained through a plurality of words and/or sentences. Specifically, when the data corresponding to the contents of the telephone conversation of the counterpart is input, the AI model may be trained to acquire data corresponding to the next contents of the telephone conversation following the contents of the telephone conversation of the counterpart. At this time, the data may be predetermined as codes, matrices or vectors that match various words or texts, respectively.

The dialog manager 1030 may use information included in the knowledge dictionary. For example, the information that Starbucks and Coffeebean, and the like, are brand names of coffee shop, or information that Nike and Adidas are names of sports goods brands may be acquired from the knowledge dictionary 1035.

When the data corresponding to the contents of the telephone conversation generated through the dialog manager 1030 are generated, the language generation engine 1040 may convert the generated data to a word data format, and the text to speech synthesis engine 1045 may convert the data of the word data format to the audio stream data again.

As a result of the converted audio stream data being transmitted to the external device 20 via the electronic apparatus 100, the contents of the telephone conversation generated from the cloud server may be provided to the counterpart 10 through the external device 20 as a voice of the voice assistant.

By using the data received by the dialogue manager 1030 and the data generated in the dialogue manager 1030, that is, information on the contents of the telephone conversation between the voice assistant and the counterpart, the malicious & context classifier 1050 may determine the purpose of the call request of the counterpart. To this end, the malicious & context classifier 1050 may use the AI model (malicious model) trained through an AI assistant deep learning manager 1060. In addition, the malicious & context classifier 1050 may determine the purpose of the call request according to whether the information of the user identified through the pre-stored user database 1065 matches the information of the user included in the contents of the telephone conversation of the counterpart. In addition, the malicious & context classifier 1050 may determine the purpose of the call request according to whether the preset word, such as "loan" and "advertisement" is included in the contents of the telephone conversation of the counterpart, and determine the purpose of the call request by analyzing a context or pattern of the contents of the telephone conversation between the voice assistant and the counterpart.

The purpose of the call request determined in real time via the malicious & context classifier 1050 may be used for the dialog manager 1030 to generate the contents of the telephone conversation of the voice assistant. For example, if it is determined that the purpose of the call request is a "loan advertisement", the content of telephone conversation "I will not receive loans" may be generated.

The summarize engine 1070 may summarize the contents of the telephone conversation between the voice assistant and the counterpart and acquire summary information. At this time, the AI model trained to summarize a text may be used.

The summarize engine 1070 may summarize the contents of the telephone conversation between the voice assistant and the counterpart only when the purpose of the call request which is determined through the malicious & context classifier 1050 is not a predetermined purpose, such as advertising and crimes, or the like.

The acquired summary information may be provided to the user 30 via the call application 1005 of the electronic apparatus 100, along with a notification of the received call request. In addition, a UI for direct communication with the user and the counterpart may be provided through the call app 1005. The notification of the received call request and the UI may be output through the call application 1005 only when the purpose of the call request determined through the malicious & context classifier 1050 is not a predetermined purpose.

When the user starts a direct call through the corresponding UI and the user ends the call with the counterpart (through the call receiver service 1010), the AI assistant deep learning manager 1060 may use the information on the purpose of the call request which is input from the user through the call application 1005 to learning of the AI model (malicious model) for determining the purpose of the call request.

Figure 11:
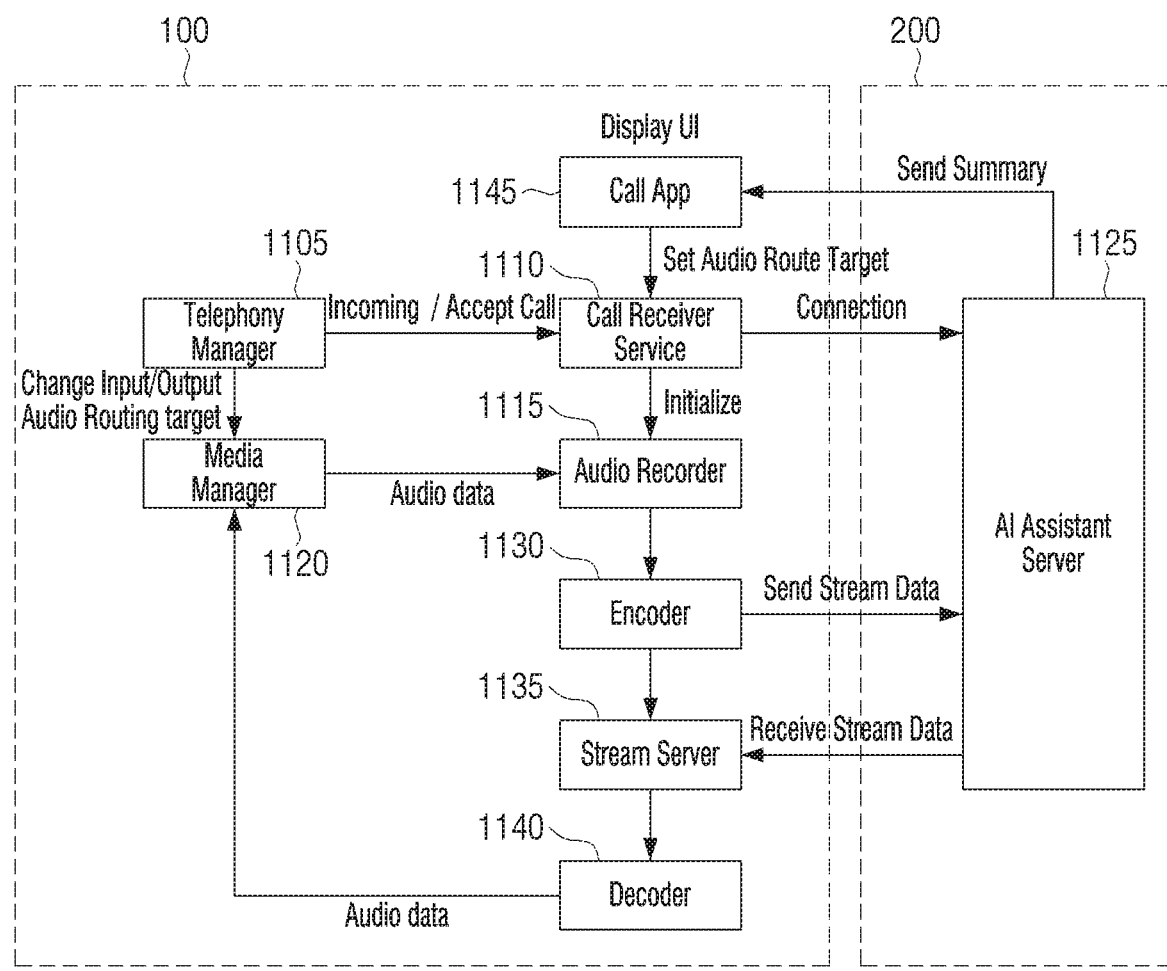
FIG. 11 is a block diagram illustrating a system configuration and an operation of an electronic apparatus and a cloud server to transmit data for a voice of a counterpart which is input through the electronic apparatus to the cloud server according to an embodiment of the disclosure.

FIG. 11 is a block diagram illustrating a system configuration and an operation of an electronic apparatus and a cloud server to transmit data for a voice of a counterpart which is input through the electronic apparatus to the cloud server according to an embodiment of the disclosure.

Referring to FIG. 11, the electronic apparatus 100 may receive a call request from a telephony manager 1105. To do this, the telephony manager 1105 may communicate with the interface of middleware hierarchy, such as a hardware abstraction layer (HAL) and a radio interface layer (RIL), or the like.

When the call request is received, a call receiver service application 1110 may enable an audio recorder 1115 to start its operation. At this time, the audio recorder 1115 may be routed to receive audio data for the call. Specifically, the audio recorder 1115 may receive audio data for a call from a media manager 1120 that receives audio data for a call from the telephony manager 1105, and record the audio data. As a result, during the telephone conversation between the voice assistant and the counterpart, audio data corresponding to contents of the telephone conversation of the counterpart may be recorded.

When the call request is received, the call receiver service application 1110 may control the electronic apparatus 100 to start communication connection with an AI assistant server 1125 of the cloud server 200.

The audio data recorded from the audio recorder 1115 may be transmitted to the AI assistant server 1125 through an encoder 1130 in a stream data format. As a result, the AI assistant server 1125 may recognize the telephone conversation content of the counterpart during the telephone conversation between the voice assistant and the counterpart.

The AI assistant server 1125 may acquire the contents of the telephone conversation of the voice assistant to be followed by the contents of the telephone conversation of the counterpart using the AI model trained to generate the contents of the telephone conversation (of the voice assistant), and transmit the corresponding stream data to a stream server 1135. Thereafter, the received stream data is converted into an audio data format through a decoder 1140 and transmitted to an external device of the counterpart. As a result, the counterpart may hear the voice of the voice assistant.

Meanwhile, the AI assistant server 1125 may determine the purpose of the call request of the counterpart using the contents of the telephone conversation between the voice assistant and the counterpart. In addition, the AI assistant server 1125 may acquire summary information about the contents of the telephone conversation between the voice assistant and the counterpart.

The summary information acquired through the AI assistant server 1125 may be transmitted to a call application 1145, and the summary information may be transmitted only when the purpose is not a predetermined purpose, such as advertisement purpose and criminal purpose, and the like.

Thereafter, according to the command of the call application 1145, the electronic apparatus 100 may notify the user of the received call request. At this time, the electronic apparatus 100 may be implemented to use various methods, such as vibration, ring sound output, guidance text display, announcement voice output, and the like.

According to the command of the call app 1145, the electronic apparatus 100 may display the summary information and the UI for the user to perform a direct call with the counterpart.

At this time, if a user command for starting a direct call with the counterpart is input from the user, the call application 1145 may control the call receiver service application 1110 so that audio data corresponding to the contents of the telephone conversation of the counterpart are routed to a voice outputter (not shown) of the electronic apparatus 100, instead of the audio recorder 1115. In this case, the audio outputter may be a speaker or an earphone/headphone terminal, and the content of the counterpart's call may be transmitted to the user through the audio outputter.

Figure 12:
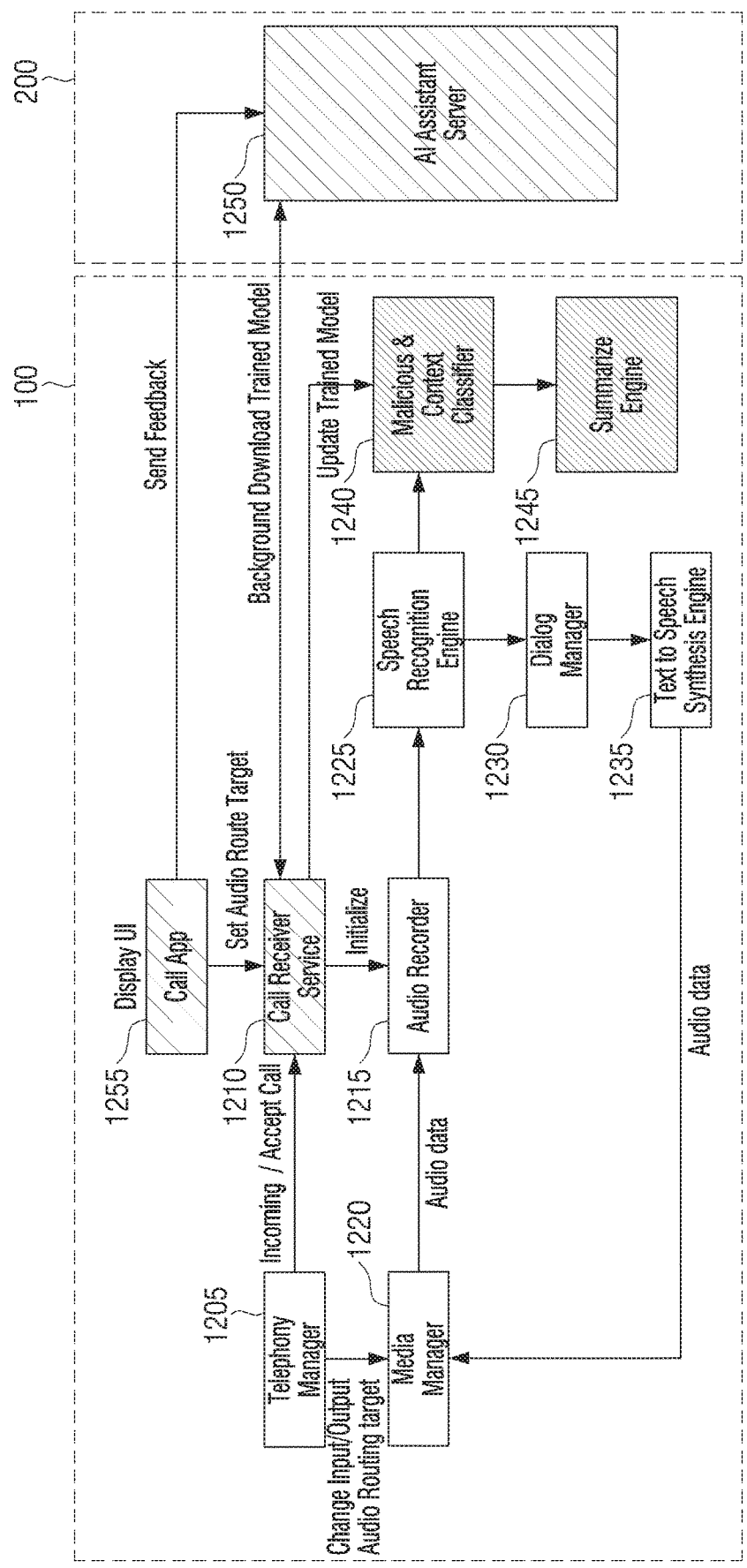
FIG. 12 is a block diagram illustrating a system configuration of an electronic apparatus and a cloud server when AI models are directly stored in the electronic apparatus according to an embodiment of the disclosure.

FIG. 12 is a block diagram illustrating a system configuration and operation of an electronic apparatus and a cloud server when AI models are directly stored in an electronic apparatus 100 according to an embodiment of the disclosure.

Referring to FIG. 12, when a call request is received through a telephony manager 1205, a call receiver service application 1210 may enable an audio recorder 1215 to start its operation. At this time, the audio recorder 1215 may be routed to receive audio data for the call. Specifically, the audio recorder 1215 may receive audio data for a call from a media manager 1220 that receives audio data for a call from the telephony manager 1205, and record the audio data. As a result, during the telephone conversation between the voice assistant and the counterpart, audio data corresponding to contents of the telephone conversation of the counterpart may be recorded.

Specifically, when the call request is received through the telephony manager 1205, a call between the voice assistant and the counterpart may be started through the call receiver service application 1210. At this time, the contents of the telephone conversation of the counterpart recorded through the audio recorder 1215 may be recognized as a text form through a speech recognition engine 1225.

The electronic apparatus 100 may generate contents of the telephone conversation following the recognized text in the speech recognition engine 1225 through a dialog manager 1230 using the AI model that is trained to generate contents of the telephone conversation, and the generated contents of the telephone conversation may be converted into voice data through a text to speech synthesis engine 1235 and transmitted to the external device of the counterpart as the voice of the voice assistant.

Meanwhile, the electronic apparatus 100 may determine the purpose of the call request by using the text recognized through a malicious & context classifier 1240. At this time, the Malicious & context classifier 1240 may use the AI model trained to determine the purpose of the counterpart to the telephone conversation according to the contents of the telephone conversation.

If the purpose of the determined call request is not a predetermined purpose, a summarize engine 1245 may obtain summary information by summarizing the contents of the telephone conversation between the voice assistant and the counterpart. At this time, the AI model trained to summarize the text (contents of the telephone conversation) may be used.

A call application 1255 may then control the electronic apparatus 100 to provide notification of the acquired summary information and the call request. In addition, a UI for performing a direct call with the counterpart may be provided.

In the meantime, at least one of the AI model trained to generate the contents of the telephone conversation, the AI model trained to determine the purpose of the telephone conversation counterpart, or the AI model trained to summarize the text may be trained on an AI assistant server 1250, and may be updated in the electronic apparatus 100 in such a manner that data of the trained model is transmitted to the electronic apparatus 100 whenever learning is performed.

In this case, the call application 1255 may receive feedback information on the purpose of the call request from the user who has made a direct call with the counterpart, and transmit the inputted feedback information to the AI assistant server 1250. In addition, the call receiver service application 1210 may transmit the contents of the telephone conversation between the voice assistant and the counterpart to the AI assistant server 1250.

As a result, in the AI assistant server 1250, the AI model trained to determine the purpose of the telephone conversation counterpart is trained according to the contents of the feedback information and the call, and data of the trained AI model may be transmitted back to the electronic apparatus 100. The AI model pre-stored in the electronic apparatus 100 and trained to determine the purpose of the telephone conversation counterpart may be updated.

Figure 13:
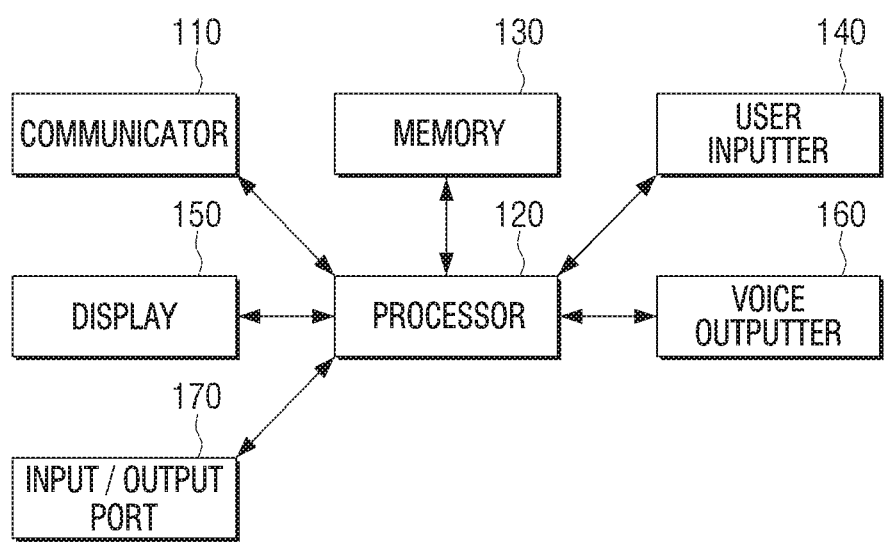
FIG. 13 is a block diagram illustrating a configuration of an electronic apparatus according to an embodiment of the disclosure.

FIG. 13 is a block diagram illustrating a configuration of an electronic apparatus according to an embodiment of the disclosure.

Referring to FIG. 13, the electronic apparatus 100 may further include at least one of a memory 130, a user inputter 140, a display 150, a voice outputter 160, or an input/output port 170, in addition to the communicator 110 and the processor 120.

The memory 130 is a configuration for storing an operating system (OS) for controlling the overall operation of the components of the electronic apparatus 100 and instructions or data related to the components of the electronic apparatus 100.

The memory 130 may be implemented as a nonvolatile memory (for example: hard disk, solid state drive (SSD), flash memory), volatile memory, or the like.

The memory 130 may store one or more applications for performing a call and an application for providing a voice service, or the like.

The memory 130 may store at least one of the AI model trained to generate contents of the telephone conversation, the AI model trained to determine the purpose of the telephone conversation counterpart, or the AI model trained to summarize the text.

The memory 130 may store a list of phone numbers of a user, a family member, a friend, a business partner, a business person, and the like. The list may include a telephone number which is input through a user command.

The user inputter 140 is a configuration for receiving a user command for a function to be performed by the electronic apparatus 100 or a user input corresponding to information.

The user inputter 140 may include one or more buttons, a keyboard, a mouse (not shown), or the like, for receiving a user input.

The user inputter 140 may include a touch panel (not shown) implemented with the display 150 to receive a user input in a touch form or a separate touch pad (not shown).

The user inputter 140 may include one or more cameras (not shown) for receiving a user input in the form of a motion. At this time, one or more cameras (not shown) may be a digital camera including an optical sensor.

The user inputter 140 may include a microphone (not shown) to receive a user input as a voice.

The display 150 is a configuration for displaying one or more images under the control of the processor 120. The display 150 may be implemented as a liquid crystal display (LCD), a plasma display panel (PDP), an organic light emitting diode (OLED), or a transparent organic light emitting diode (TOLED), or the like. If the display is implemented as an LCD, a driving circuit (not shown), a backlight unit (not shown) that may be implemented in the form of an a-si TFT, a low temperature poly silicon (LTPS) TFT, an organic TFT (OTFT) and the like may also be included.

Meanwhile, the display 150 may be implemented as a touch screen including a touch panel capable of sensing a user's touch operation, and may be included in the user inputter 140.

The voice outputter 160 is a configuration for outputting a specific voice under the control of the processor 120. The voice outputter 160 may output a ring tone for notifying the received call request and a calling voice of the counterpart. In addition, the summary information of the contents of the telephone conversation between the voice assistant and the counterpart may be output in a voice form.

The voice outputter 160 may include a speaker (not shown) and/or a headphone/earphone output terminal (not shown).

Through the input/output port 170, the electronic apparatus 100 may transceive signal and data with one or more external devices (not shown).

To this end, the input/output port 170 may be implemented as a wired port, such as a high-definition multimedia interface (HDMI) port, a display port, a red-green-blue (RGB) port, a digital visual interface (DVI) port, a Thunderbolt, a component port, and the like.

The input/output port 170 may be implemented as the HDMI port or a Thunderbolt, and may be implemented to transmit an image and a voice signal together. However, a first port for transmitting an image signal and a second port for transmitting a voice signal may be implemented separately.

The input/output port 170 may include an interface module, such as a universal serial bus (USB), and may be physically connected to an external terminal device, such as a PC through the interface module to transceive voice or image data or transceiver firmware data to perform firmware upgrade.

Hereinbelow, a controlling method of the electronic apparatus according to the disclosure will be described.

Figure 14:
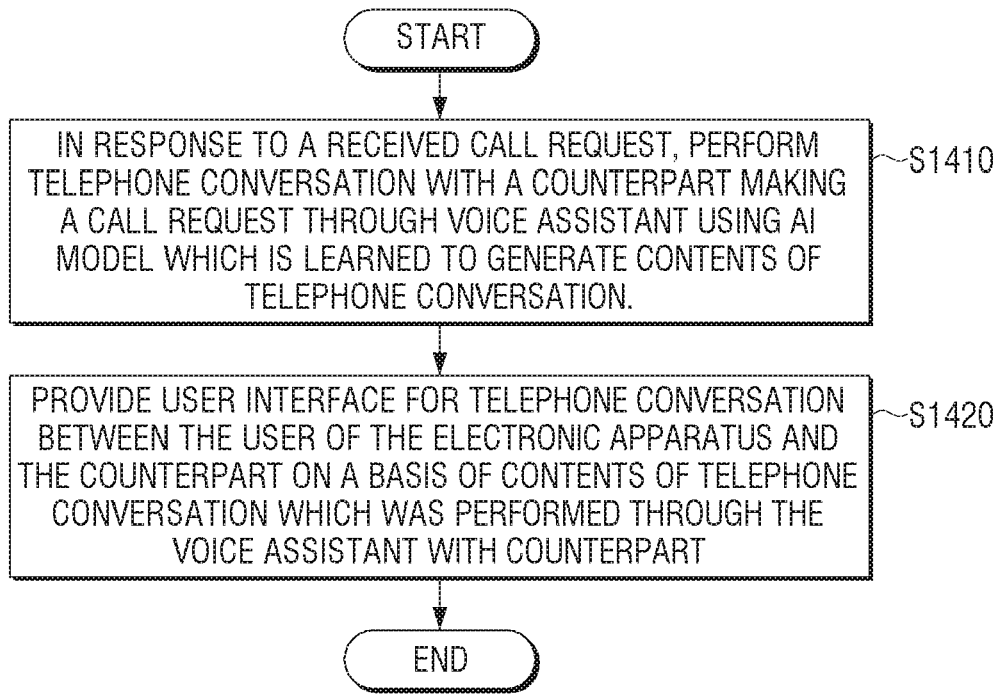
FIG. 14 is a flowchart illustrating a controlling method of an electronic apparatus according to an embodiment of the disclosure.

FIG. 14 is a flowchart illustrating a controlling method of an electronic apparatus according to an embodiment of the disclosure.

Referring to FIG. 14, the method may perform telephone communication with the counterpart making a call request through the voice assistant using the AI model trained to generate contents of telephone conversation, in response to the received call request at operation S1410. In this case, the call may be performed with the counterpart through the voice assistant, without notifying the user of the received call request.

Specifically, contents of telephone conversation of the voice assistant may be generated based on contents of telephone conversation of the counterpart, and the voice data corresponding to the contents of the telephone conversation of the voice assistant may be transmitted to an external device (not shown) of the counterpart that has made the call request. As a result, the voice assistant's voice may be transmitted (heard) to the counterpart.

The method may include identifying whether the telephone number of the counterpart who has made the call request is included in the pre-stored list. If the telephone number of the counterpart is not included in the pre-stored list, the call may be performed with the counterpart using the voice assistant.

Then, based on the contents of the telephone conversation made with the counterpart through the voice assistant, a UI for a call between the user of the electronic apparatus and the counterpart may be provided at operation S1420.

The UI may include a notification for the received call request. Through the UI, a user command for starting or rejecting a call with the counterpart may be received.

At this time, if the purpose of the call request obtained based on the content of the telephone conversation made with the counterpart through the voice assistant corresponds to the predetermined purpose, the call with the counterpart through the voice assistant may be terminated. The information on the received call request may not be notified to the user.

If the purpose of the call request does not correspond to the predetermined purpose, the UI between the user and the counterpart may be provided.

The predetermined purpose may include an advertisement purpose and criminal purpose, and the like, and may be a predetermined purpose by a user command. In addition, it may include the "unclear purpose", if it is impossible to identify the clear purpose.

The method may determine the purpose of the call request based on the contents of the telephone conversation made with the counterpart through the voice assistant through the AI model trained to determine the purpose of the counterpart through the contents of the telephone conversation.

In this case, it is possible to determine the purpose of the call request according to whether the counterpart has uttered a predetermined word or sentence during a call made with the counterpart through the voice assistant. For example, if the counterpart uttered a word or sentence, such as "account number" or "do not notify the police", it can be determined that the purpose of the call request is criminal purpose, such as voice phishing or threat.

In addition, the purpose of the call request may be determined by using the authenticity of the information about the user which the counterpart has said. Specifically, if the counterpart has said the user's information but the information that the counterpart has said does not match the information of the user pre-stored in the electronic apparatus, it may be determined that the purpose of the call request is for fraud or voice phishing.

Further, it is possible to determine the purpose of the call request based on the context information of the contents of the telephone conversation performed with the counterpart through the voice assistant. For example, when the voice assistant asks a specific content, if the counterpart immediately terminates the call, or the counterpart says contents which are not related to the specific contents of the voice assistant, it may be determined that the purpose of the call request is unclear.

This method may include acquiring summary information on the call made with the counterpart through the voice assistant based on the contents of the telephone conversation made with the counterpart through the voice assistant. In this case, a UI including the acquired summary information and for receiving the user command for starting or rejecting a call between the user and the counterpart may be output.

At this time, if a user command for providing a message to the counterpart is input through the UI, the message may be provided to the counterpart through the voice assistant. Specifically, as a result of transmitting the voice data corresponding to the message to an external device (not shown) of the counterpart, the counterpart can receive the voice message with the voice of the voice assistant.

Figure 15:
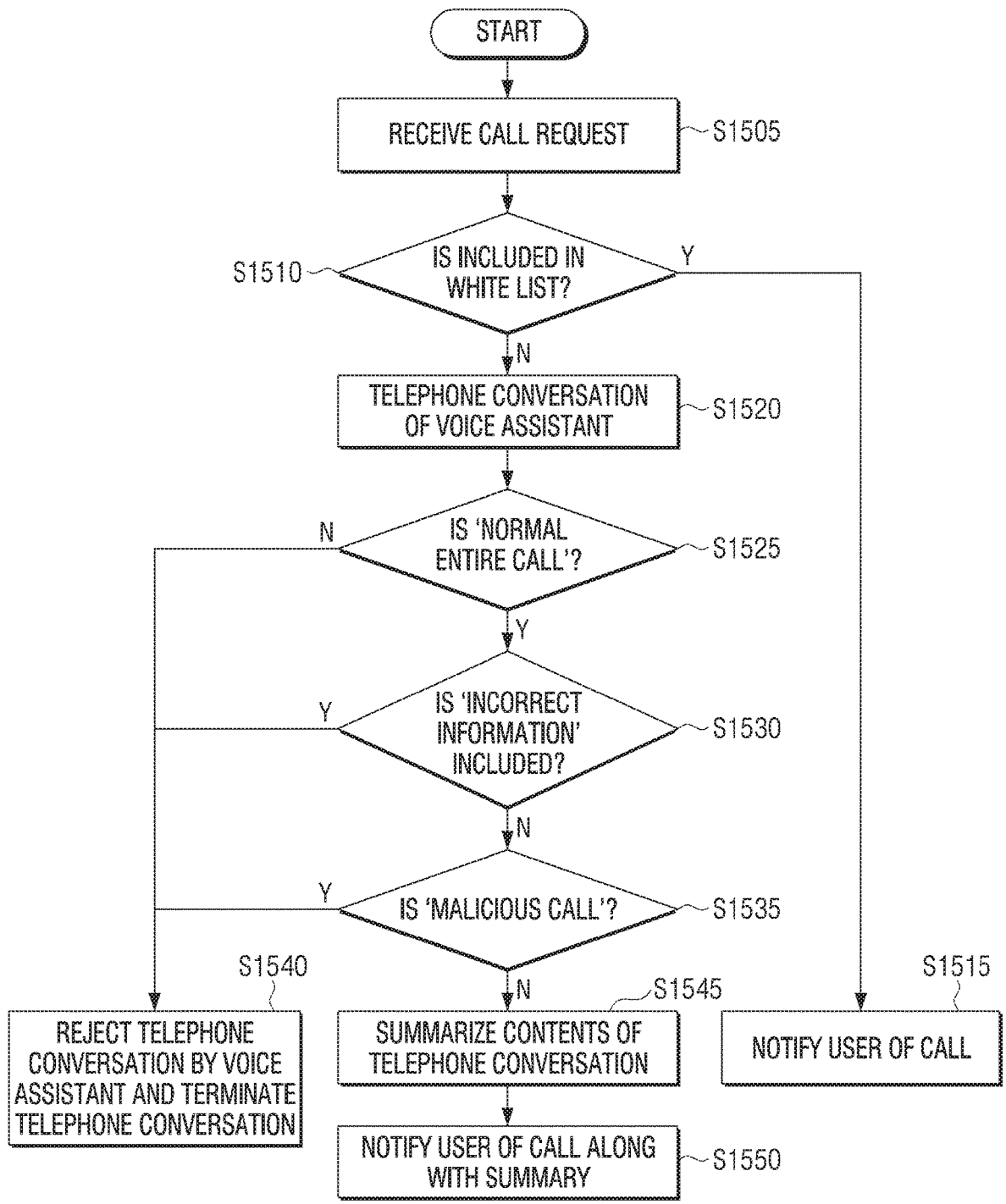
FIG. 15 is an algorithm illustrating a controlling method according to an embodiment of the disclosure.

FIG. 15 is an algorithm illustrating a controlling method according to an embodiment of the disclosure.

Referring to FIG. 15, when a call request is received from the external device of the counterpart at operation S1505, it is possible to identify whether the counterpart's telephone number corresponding to the call request is included in the pre-stored white list at operation S1510. The white list may include the telephone number of the user's family, friends, acquaintances, business persons, and the like, of the electronic apparatus, and the telephone number included in the white list may be added according to the user's command.

If the telephone number of the counterpart is included in the white list at operation S1510-Y, the user may be immediately notified that the call request has arrived at operation S1515. In this case, a UI for providing a call between the user and the counterpart may be provided, and a user command for starting or rejecting a call with the counterpart may be input through the UI.

If the telephone number of the counterpart is not included in the white list at operation S1510-N, the user may perform a call with the counterpart through the voice assistant at operation S1520. At this time, the user may not receive the notification of the received call request.

It may be identified that the contents of the telephone conversation between the voice assistant and the counterpart is a "normal entire call" at operation S1525. The normal entire call indicates that there is no defect in the context of the telephone conversation.

In addition, it is possible to identify whether the contents of the telephone conversation between the voice assistant and the counterpart include "false information" for the user at operation S1530. More specifically, it is possible to identify whether there is incorrect user information in the contents of the telephone conversation uttered by the counterpart.

It is possible to identify whether the purpose of the call request is malicious through the AI model that is trained to determine the purpose of the counterpart through the contents of the telephone conversation at operation S1535.

If the contents of the telephone conversation are not "Normal entire call" at operation S1525-N, include "Incorrect information" at operation S1530-Y, or correspond to "Malicious call" at operation S1535-Y, the call with the counterpart may be terminated through the voice assistant at operation S1540. In this case, it is possible to notify the counterpart of the call rejection through the voice assistant and may not notify the user that the call request has been received.

If the contents of the telephone conversation are the "Normal entire call" at operation S1525-Y, do not include "incorrect information" at operation S1530-N, and are not "malicious call" at operation S1535-N, the contents of the telephone conversation may be summarized and summary information may be acquired at operation S1545. The user may receive the summary information and be notified that the call request has been received.

Although not shown in FIG. 15, if the call between the user and the counterpart is started by the user command after at operation S1550, the feedback information may be received from the user after the call between the user and the counterpart is terminated. The AI model trained to determine the purpose of the counterpart may be trained based thereon.

The feedback information may be the purpose of the call request of the counterpart which is input from the user.

The method of the electronic apparatus according to the disclosure, in obtaining summary information, may include identifying a word of a predetermined type from a voice received from the counterpart during a call made with the counterpart through the voice assistant, adding the identified word to a prestored sentence including the type of the identified word and generating summary information.

Figure 16:
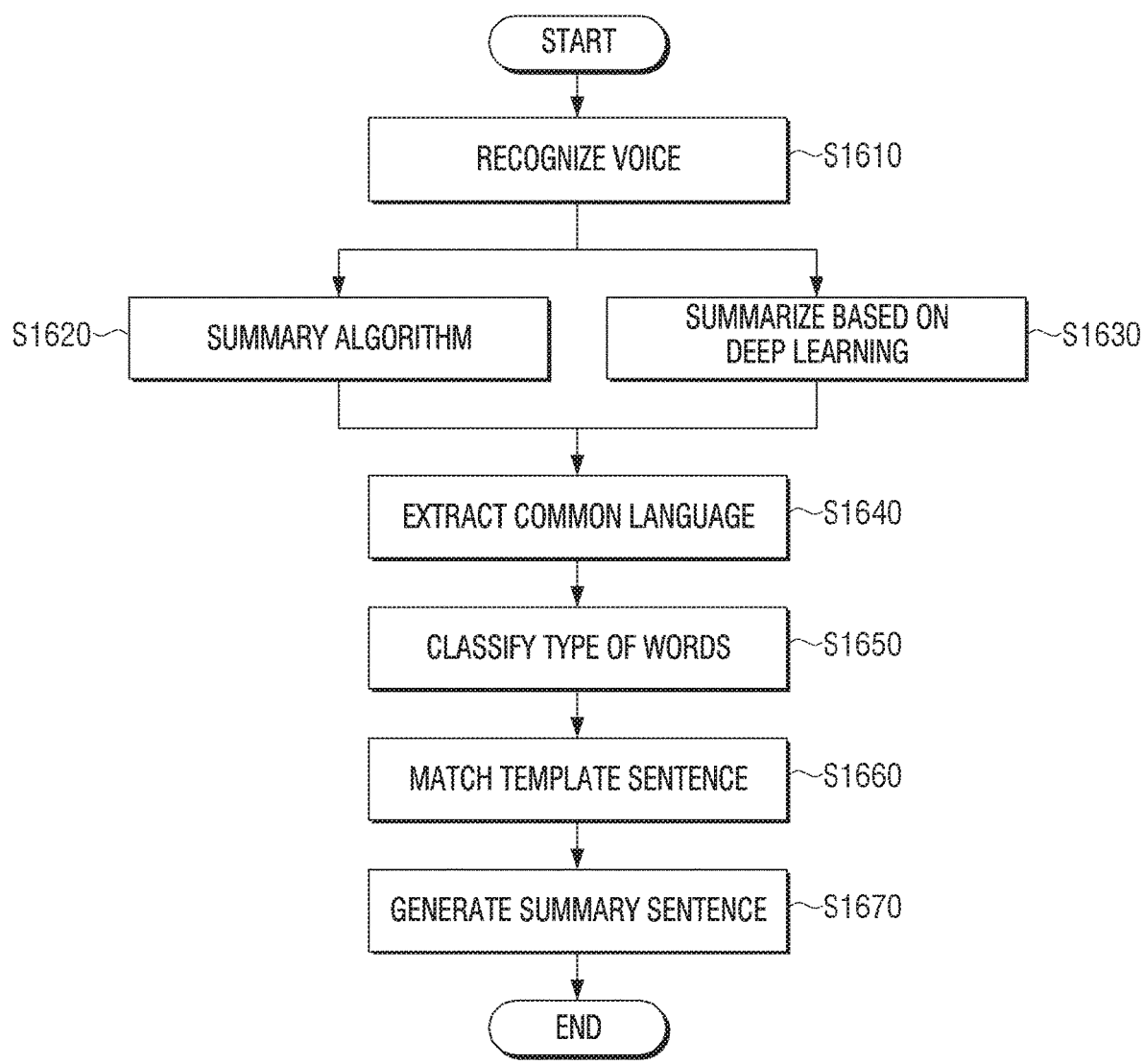
FIG. 16 is a flowchart illustrates an operation of summarizing a telephone conversation between a voice assistant and a counterpart in a controlling method of according to an embodiment the disclosure.

FIG. 16 is a flowchart illustrating an operation of summarizing a telephone conversation between a voice assistant and a counterpart in a controlling method according to an embodiment of the disclosure.

Referring to FIG. 16, by recognizing the voice included in the call between the voice assistant and the counterpart at operation S1610, the text may be acquired.

Then, the obtained text may be summarized using the summary algorithm at operation S1620. At this time, the algorithm scheme of the related art of "the sentence unit separation—word class tagging—deletion of a stop word—extraction of a noun unit—calculation of a weight of a word" may be used but is not limited thereto.

The obtained text may be summarized by using the deep learning-based AI model which is trained to summarize a text at operation S1630.

From the summary results of each of S1620 and S1630, a common word may be extracted at operation S1640.

The types of words included in the common language may be classified at operation S1650. At this time, a word corresponding to the predetermined type may be identified. For example, "ABCD company" for "brand" and "customer satisfaction survey" for "purpose" type may be identified.

A template sentence including the type corresponding to the identified word may be matched at operation S1660. Specifically, it is possible to search for a sentence including only the type corresponding to the identified word among the pre-stored template sentences. For example, it may be searched for a template sentence, such as "this is a call for 'purpose' of 'brand'" including only "brand" and "purpose" types.

A summary sentence may be generated using the searched template sentence and the identified word at operation S1670. Specifically, each identified word may be added to each of the corresponding type portions included in the retrieved template sentence. For example, "ABCD Company" and "Customer satisfaction survey" may be added to the template sentence "this is a call for 'purpose' of the 'brand'", generating a summary sentence "this is 'customer satisfaction survey' of 'ABCD company'"

The various embodiments of the method of the electronic apparatus may be performed through the electronic apparatus 100 described through FIGS. 2 and 13.

The embodiments may be implemented by the electronic apparatus 100 or one or more external devices (not shown). Examples illustrated in FIGS. 10 to 12 may be included but are not limited thereto.

Meanwhile, the various embodiments described above may be implemented in a recording medium that may be read by a computer or similar device using software, hardware, or a combination thereof.

According to a hardware implementation, the embodiments described in this disclosure may be implemented by using at least one of application specific integrated circuits (ASICs), digital signal processors (DSPs), digital signal processing devices (DSPDs), programmable logic devices (PLDs), field programmable gate arrays (FPGAs), a processor, a controller, a micro-controller, a microprocessor, or an electrical unit for performing other functions.

In some cases, embodiments described herein may be implemented by the processor 120 itself. According to a software implementation, embodiments, such as the procedures and functions described herein may be implemented with separate software modules. Each of the above-described software modules may perform one or more of the functions and operations described herein.

Meanwhile, computer instructions for performing the processing operations according to various embodiments of the disclosure described above may be stored in at least one non-transitory computer-readable medium. Computer instructions stored in such at least one non-transitory computer-readable media may cause a particular device to perform processing operations of the electronic apparatus 100 according to various embodiments described above when executed by a processor.

Non-volatile computer readable medium means a medium that stores data for a short period of time, such as a register, a cache, a memory, and the like, but semi-permanently stores data and can be read by a device. Specific examples of at least one non-transitory computer readable media include compact disc (CD), digital versatile disc (DVD), hard disk, Blu-ray disk, USB, memory card, ROM, and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a communicator;
   at least one memory for storing instructions; and
   at least one processor configured to execute the stored instructions to at least:
   in response to a call being received through the communicator, perform a first telephone conversation with a counterpart originating the call through a voice assistant using an artificial intelligence (AI) model which is trained to generate content of telephone conversations,
   generate a summary of the first telephone conversation based on content of the first telephone conversation, the summary identifying a purpose of the first telephone conversation,
   provide a user interface for a second telephone conversation between a user of the electronic apparatus and the counterpart, the user interface including the summary, and
   based on information including the summary different from prestored information of the user, identify that the purpose is malicious.

2. The electronic apparatus of claim 1,
   wherein the at least one memory stores a list including one or more telephone numbers, and
   wherein the at least one processor is further configured to:

based on the telephone number of the counterpart being included in the list, provide the user interface for the second telephone conversation, and based on the telephone number of the counterpart not being included in the list, perform the first telephone conversation with the counterpart through the voice assistant.

3. The electronic apparatus of claim 1, wherein the at least one processor is further configured to:

based on a purpose of the call obtained based on the content of the first telephone conversation corresponding to a predetermined purpose, terminate the first telephone conversation performed with the counterpart through the voice assistant, and based on the purpose of the call not corresponding to a predetermined purpose, provide the user interface.

4. The electronic apparatus of claim 1, wherein the at least one processor is further configured to receive a user command to start or reject the second telephone conversation between the user of the electronic apparatus and the counterpart through the user interface.

5. The electronic apparatus of claim 4, wherein the at least one processor is further configured to, based on a user command to provide the counterpart with a message being input through the user interface, provide the counterpart with the message through the voice assistant.

6. The electronic apparatus of claim 4, wherein the at least one processor is further configured to:

generate the summary by identifying a word of a predetermined type from a voice received from the counterpart during the first telephone conversation performed with the counterpart through the voice assistant, and add the identified word to a prestored sentence including the type of the identified word.

7. The electronic apparatus of claim 3, wherein the at least one processor is further configured to determine the purpose of the call based on the content of the first telephone conversation performed with the counterpart through the voice assistant, using an AI model which is trained to determine a purpose of the counterpart for the call through content of telephone conversations with the counterpart.

8. The electronic apparatus of claim 7, wherein the AI model which is trained to determine the purpose of the counterpart for the call through content of telephone conversations with the counterpart, is trained based on the content of the first telephone conversation performed with the counterpart through the voice assistant and the purpose of the call which is input by the user after the second telephone conversation between the user of the electronic apparatus and the counterpart is terminated.

9. The electronic apparatus of claim 3, wherein the at least one processor is further configured to determine the purpose of the call based on at least one of:

whether counterpart utters a predetermined word or sentence during the first telephone conversation performed with the counterpart through the voice assistant, whether information on the user uttered by the counterpart is genuine, or context information of the content of the first telephone conversation.

10. A controlling method of an electronic apparatus, the method comprising:

in response to a call being received through a communicator, performing a first telephone conversation with a counterpart originating the call through a voice assistant using an artificial intelligence (AI) model which is trained to generate content of telephone conversations;

generating a summary of the first telephone conversation based on content of the first telephone conversation, the summary identifying a purpose of the first telephone conversation;

providing a user interface for a second telephone conversation between a user of the electronic apparatus and the counterpart, the user interface including the summary; and based on information including the summary different from prestored information of the user, identifying that the purpose is malicious.

11. The method of claim 10, further comprising:

identifying whether a telephone number of the counterpart is included in a prestored list, wherein the performing of the first telephone conversation with the counterpart originating the call through the voice assistant comprises, based on the telephone number of the counterpart not being included in the prestored list, performing the first telephone conversation with the counterpart originating the call using the voice assistant.

12. The method of claim 10, further comprising:

based on a purpose of the call obtained based on the content of the first telephone conversation corresponding to a predetermined purpose, terminating the first telephone conversation performed with the counterpart through the voice assistant, wherein the providing of the user interface for telephone conversation between the user and the counterpart comprises, based on the purpose of the call not corresponding to a predetermined purpose, providing the user interface for the second telephone conversation between the user and the counterpart.

13. The method of claim 10, wherein the providing of the user interface comprises outputting the user interface which includes the summary and which is for receiving a user command to start or reject the second telephone conversation between the user and the counterpart.

14. The method of claim 13, further comprising:

based on a user command to provide the counterpart with a message being input through the user interface, providing the counterpart with the message through the voice assistant.

15. The method of claim 13, wherein the generating of the summary comprises:

generating the summary by identifying a word of a predetermined type from a voice received from the counterpart during the first telephone conversation performed with the counterpart through the voice assistant; and adding the identified word to a prestored sentence including the type of the identified word.

16. The method of claim 12, further comprising:

determining the purpose of the call based on the content of the first telephone conversation performed with the counterpart through the voice assistant, using an AI model which is trained to determine a purpose of the counterpart for the call through content of telephone conversations with the counterpart.

17. The method of claim 16, further comprising:

training the AI model, which is trained to determine the purpose of the counterpart for the call through content of telephone conversations with the counterpart, based on the purpose of the call which is input by the user after the telephone conversation between the user of the electronic apparatus and the counterpart is terminated.

18. The electronic apparatus of claim 1,
wherein the call is received through the communicator from an external apparatus of the counterpart, and
wherein the at least one processor is further configured to, in response to audio stream data corresponding to content generated by the AI model being received from a server, transmit the received audio stream data to the external apparatus of the counterpart.

19. The electronic apparatus of claim 1,
wherein the call is received through the communicator from an external apparatus of the counterpart, and
wherein the at least one processor is further configured to, in response to stream data corresponding to content generated by the AI model being received from a server, convert the received stream data to audio stream data, and transmit the audio stream data to the external apparatus of the counterpart.

20. At least one non-transitory computer readable medium configured to store computer instructions executed by at least one processor of an electronic apparatus to cause the electronic apparatus to perform steps including:
- in response to a call being received through a communicator, performing a first telephone conversation with a counterpart originating the call through a voice assistant using an artificial intelligence (AI) model which is trained to generate content of telephone conversations;
- generating a summary of the first telephone conversation based on content of the first telephone conversation, the summary identifying a purpose of the first telephone conversation;
- providing a user interface for a second telephone conversation between a user of the electronic apparatus and the counterpart, the user interface including the summary; and
- based on information including the summary different from prestored information of the user, identifying that the purpose is malicious.

* * * * *